United States Patent [19]

Nakai et al.

[11] E Patent Number: Re. 33,015

[45] Reissued Date of Patent: Aug. 8, 1989

[54] CAMERA SYSTEM OPERABLE IN ACCORDANCE WITH STORED MEMORY

[75] Inventors: Masaaki Nakai, Nara; Masayoshi Sahara, Sennan; Nobuyuki Taniguchi, Tondabayashi, all of Japan

[73] Assignee: Minolta Camera Kabushiki Kaisha, Osaka, Japan

[21] Appl. No.: 919,835

[22] Filed: Oct. 15, 1986

Related U.S. Patent Documents

Reissue of:

[64] Patent No.: 4,477,164
Issued: Oct. 16, 1984
Appl. No.: 448,834
Filed: Dec. 10, 1982

[51] Int. Cl.[4] ..... G03B 17/00

[52] U.S. Cl. ..... 354/286; 354/412; 354/289.1

[58] Field of Search ..... 354/21, 412, 485, 286, 354/289.1, 455

[56] References Cited

U.S. PATENT DOCUMENTS

| | | | |
|---|---|---|---|
| 3,928,858 | 12/1975 | Sakurada et al. . | |
| 4,104,649 | 8/1978 | Tanaka et al. . | |
| 4,118,713 | 10/1978 | Murakami et al. . | |
| 4,149,795 | 4/1979 | Sakurada et al. . | |
| 4,152,061 | 5/1979 | Gordon . | |
| 4,297,011 | 10/1981 | Adams, Jr. | 354/416 |
| 4,304,463 | 12/1981 | Tomori . | |
| 4,309,089 | 1/1982 | Harvey | 354/21 |
| 4,323,303 | 4/1982 | Enomoto . | |
| 4,382,669 | 5/1983 | Tano et al. . | |
| 4,400,072 | 8/1983 | Suzuki et al. | 354/455 |
| 4,416,523 | 11/1983 | Kawabata . | |
| 4,426,147 | 1/1984 | Shiozawa et al. . | |
| 4,464,031 | 8/1984 | Iwashita et al. | 354/173.1 |

FOREIGN PATENT DOCUMENTS

| | | |
|---|---|---|
| 2645541 | 8/1985 | Fed. Rep. of Germany . |
| 48-5315 | 1/1973 | Japan . |
| 52-46815 | 4/1977 | Japan . |
| 54-108628 | 8/1979 | Japan . |
| 56-87023 | 7/1981 | Japan . |
| 56-92122 | 7/1981 | Japan . |
| 1552597 | 9/1979 | United Kingdom . |

OTHER PUBLICATIONS

The British Journal of Photography, Nov. 27, 1981 "Pentax ME-F" pp. 1214–1218.

Electronics/Apr. 27, 1978 "Linear IC Automatically Focuses Camera Lens" pp. 139–143.

Modern Photography, Jul. 1983, vol. 47, No. 7, pp. 96–103.

Chinon, "Quality 35MM SLR Cameras" Brochure, (six pages).

How To Select And Use Pentax SLR Cameras, Carl Shipman–(various pages).

Contax/Yashica Explosion—Photokina 1982, 35-mm SLRs.

Photographic Industries 1981, vol. 39, No. 13, (Front cover, Index, pp. 76–83).

Nippon Camera—Dec. 1982, p. 280.

Leitz Correfot Autofocus, "Electronic Focusing For Single-Lens Reflex Cameras with Interchangeable Lenses", 8 pages.

Photograph Industry, Feb. 1979, "Survey of Autofocus Cameras" by Yamamoto, Akira.

Photograph Industry, Using Pentax ME-F, by Nakatani, Yoshitaka.

Photograph Industry, Feb. 1982 "New Camera Test Report: Pentax ME-F", by Hozumi, Hidetsugu et al.

Photograph Industry, Feb. 1982, "New Camera Test Report: Pentax ME-F" by Technical Div. of Asaki Kogalcu Kogyo.

Photograph Industry, Nov. 1981 "First Look of New Model 1: Pentax ME-F".

Asahi Camera, Jan. 1982, "A 35mm Single Reflector Camera Containing TTL.EFC, Pentax ME-F", pp. 287–293.

Photograph Industry, Jun. 1971, "'71 Photo Expo Held" (2 pages).

Photograph Industry, Sep. 1974, Comparison of Similar Ones: 35mm Single Reflector vs. 110 Pocket Camera, by Kato Shunsei (3 pages).

Photograph Industry, May 1978, "Performance and Evaluation of Cameras Autofocus" (1), by Ogura, Iwao (5 pages).

Photograph Industry, May 1978, "Performance and

Evaluation of Cameras Autofocus" (3), by Ogura, Iwao (4 pages).
Photograph Industry, Dec. 1971, "Technical Development Of The Electronic Shutter From The Standpoint of Patents" (2 pages).
Photograph Industry, May 1982, "Trial Use of Nikon F3 AF" (4 pages).
Asahi Camera, Aug. 1983, Nikon F3AF pp. 259-266.
Photograph Industry, Mar. 1979, "Use of Electronics in Cameras and Autofocus", by Takishima, Yoshiyuki (Camera Develop. Department, Canon).
Microcomputer Dictionary and Guide by Sippl, p. 41.

*Primary Examiner*—Russell E. Adams
*Attorney, Agent, or Firm*—Burns, Doane, Swecker & Mathis

[57] ABSTRACT

A camera system is provided that permits memory data dedicated to particular camera accessories to be transmitted to the camera body for enabling the operation of the camera. The camera accessories can carry dedicated information or variable information to the camera body. Synchronization between the camera accessory and the camera body can be provided by a train of clock pulses. Information can be programmed in a fixed memory circuit to insure that only a particular accessory so designated will provide information to the camera body to prevent any erroneous inputting of data from a plurality of camera accessories that are contemplated for use with a particular camera body.

26 Claims, 19 Drawing Sheets

CAMERA SYSTEM OPERABLE IN ACCORDANCE WITH STORED MEMORY

Matter enclosed in heavy brackets [ ] appears in the original patent but forms no part of this reissue specification; matter printed in italics indicates the additions made by reissue.

BACKGROUND OF THE INVENTION

The present invention generally relates to a photographic system in which desired photographing functions are effected while signals are applied or received between a camera body and camera accessories such as an interchangeable lens, an extension ring, a motor-drive unit, an electronic flash, etc. which are mounted on or attached to said camera body, and more particularly to a camera system for deriving fixed memories stored in the respective accessories.

Generally, in a high class photographic camera such as a single lens reflex camera and the like, it has been so arranged, in many cases, that, with camera accessories such as the interchangeable lens, motor-drive unit, electronic flash unit, etc. coupled to the camera body, functionings of the respective camera accessories are controlled by a control system provided at the side of the camera body or an arrangement provided within the camera body is controlled based on information from the camera, accessories. In the latter case as described above, if various data of the respective camera accessories are adapted to be transmitted electrically, coupling portions between the camera body and the camera accessories may be simplified for convenience in use, as compared with mechanical signal transmission conventionally adopted.

Meanwhile, it has been recently proposed to effect control of the camera body and camera accessories by a microcomputer, and in the above case, there may be conceived an arrangement in which with a fixed memory circuit such as a ROM (read only memory) provided in each of the camera accessories so as to keep data specific to the camera accessory stored therein, an address within the fixed memory circuit is designated from the side of the camera body for reading the data of the designated address into the camera body.

SUMMARY OF THE INVENTION

Accordingly, an essential object of the present invention is to provide a camera system operable in accordance with stored memory, and arranged to apply and receive signals between a camera body and camera accessories attached thereto, in which the number of terminals for signal transmission therebetween is reduced as far as possible.

Another important object of the present invention is to provide a camera system of the above described type which is free from any confusion in the signal impression and reception between the camera body and camera accessories regardless of reduction in the number of terminals.

A further object of the present invention is to provide a camera system of the above described type in which the most rational system capable of effecting necessary functions by the smallest number of signal lines is pursued for effecting impression and reception of signals between the camera body and camera accessories in an efficient manner.

In accomplishing these and other objects, according to one preferred embodiment of the present invention, there is provided a camera system operable in accordance with memory data by means of carrying the memory data from a camera accessory to a camera body, and characterized in that it includes:

first means for carrying electric power from the camera body to the camera accessory to power the camera accessory;

second means for carrying a train of clock pulses from the camera body to the camera accessory to synchronize the camera accessory with the camera body;

third means for serially carrying address data from the camera body to the camera accessory to locate the memory data;

fourth means for serially carrying the memory data corresponding to the address data from the camera accessory to the camera body; and fifth means for carrying an initiating signal from the camera body to the camera accessory to control the timing of reading the memory data corresponding to the address data.

More specifically, the camera system according to the present invention is further characterized in that, with a plurality of kinds of separate camera accessories connected to the camera body, when the memories stored in the respective camera accessories are to be read into the camera body, the address data to be fed into the camera accessories from said camera body are adapted to be different according to the kinds of the camera accessories. By the above arrangement, such problems that, when the plurality of kinds of camera accessories are simultaneously coupled to one camera body and one address signal is produced from the camera body, the plurality of camera accessories are undesirably addressed, with wrong data from unexpected camera accessories being read into the camera body, may be avoided.

Other specific features of the camera system according to the present invention are such that the reading functions of the data from the particular camera accessory are repeatedly effected, whereby, in the presence of variable data such as manual setting data, etc. in the camera accessory, the camera body is capable of renewing the read-in data into the latest data at all times so as to cope with data alterations at the side of the camera accessories.

Still further features of the camera system according to the present invention reside in that, since there are some camera accessories having no data to be read, without necessity for reading into the side of the camera body, the camera system of the present invention is particularly so arranged that, in order to cope with the above situation, common data are stored in the particular address of each camera accessory and thus, at the side of the camera body, it is possible to make judgement as to whether or not the camera accessory is one having the data to be read by feeding a signal for starting the reading from the camera body side, depending on whether or not the common data as described above are fed from the side of the camera accessory.

BRIEF DESCRIPTION OF THE DRAWINGS

These and other objects and features of the present invention will become apparent from the following description taken in conjunction with the preferred embodiment thereof with reference to the accompanying drawings, in which.

DETAILED DESCRIPTION OF THE INVENTION

Figure 1:
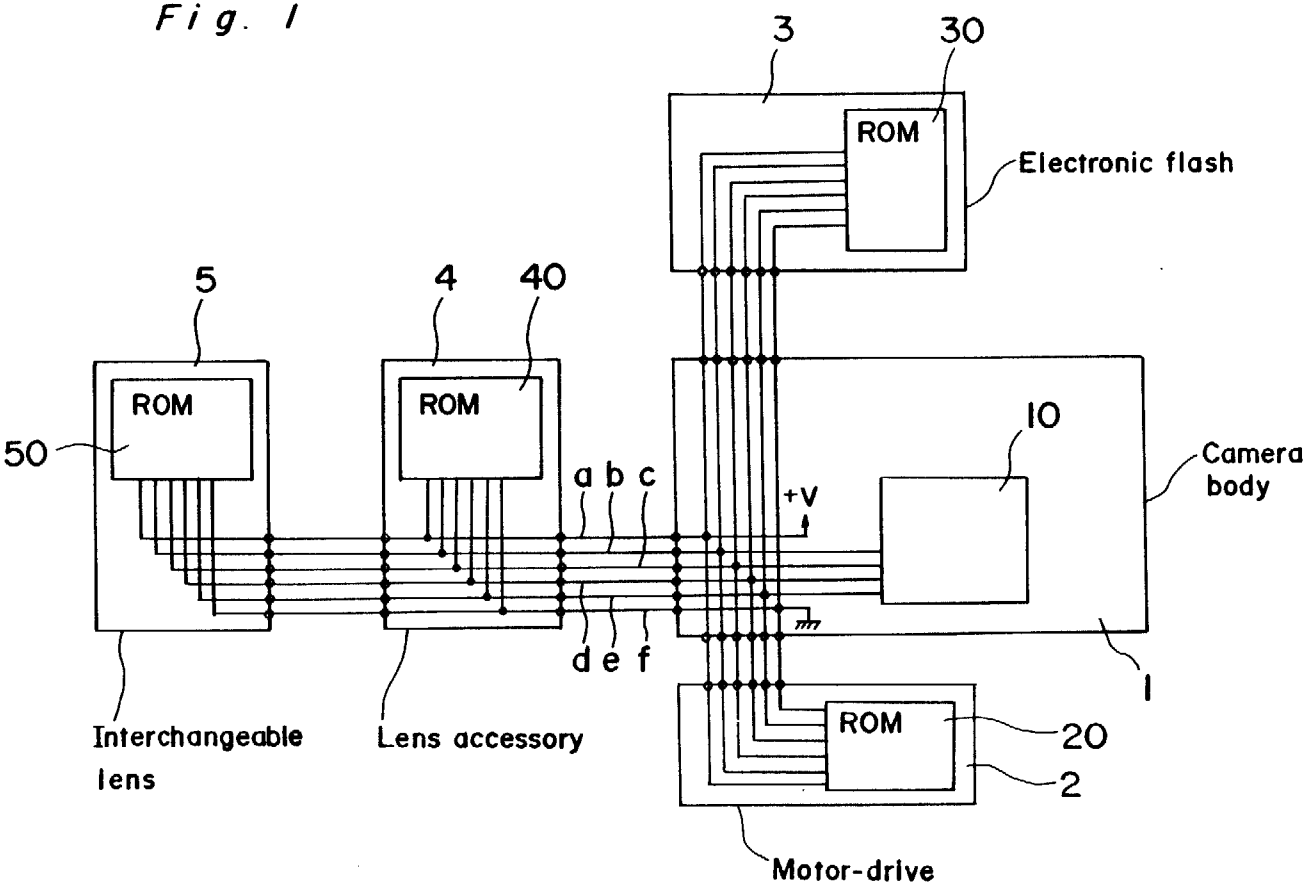
FIG. 1 is a block diagram explanatory of the principle of a camera system according to the present invention.

Before the description of the present invention proceeds, it is to be noted that like parts are designated by like reference numerals throughout the accompanying drawings.

Referring now to the drawings, there is shown in FIG. 1 a block diagram representing an entire photographing system applied with the present invention. The photographing system of FIG. 1 generally includes a camera body 1 having a central control circuit 10 provided therein for applying address data to camera accessories mounted on or attached to said camera body, and for receiving data from the camera accessories, an electrical driving accessory 2 (i.e. motor-drive and the like) in which a data output unit 20 is provided for producing data specific to the motor-drive, a camera accessory 3 for flash photography (e.g. electronic flash or the like) having a data output unit 30 incorporated therein for outputting data specific to an electronic flash, a lens accessory 4 such as an extension tube, bellows, converter lens or the like in which a data output unit 40 is provided for producing data specific to the lens accessory, and an interchangeable lens 5 having a data output unit 50 provided therein for producing data specific to the interchangeable lens, with the camera body 1 and the respective accessories 2, 3 and 4, and the camera accessories 4 and 5 being electrically connected to each other through terminals a, b, c, d, e and f respectively as shown.

In the above arrangement, electric power, a train of reference clock pulses, address data and, reset signals are supplied from the camera body 1 to the respective output units 20, 30, 40 and 50 of the camera accessories 2, 3, 4 and 5 through the terminals a, b, c and d in a manner as described in detail later, while the data specific to the respective camera accessories 2 to 5 are fed from the data output units 20 to 50 of said camera accessories 2 to 5 to the camera body 1 through the terminal e, with the terminal f being connected to the ground.

Figure 2:
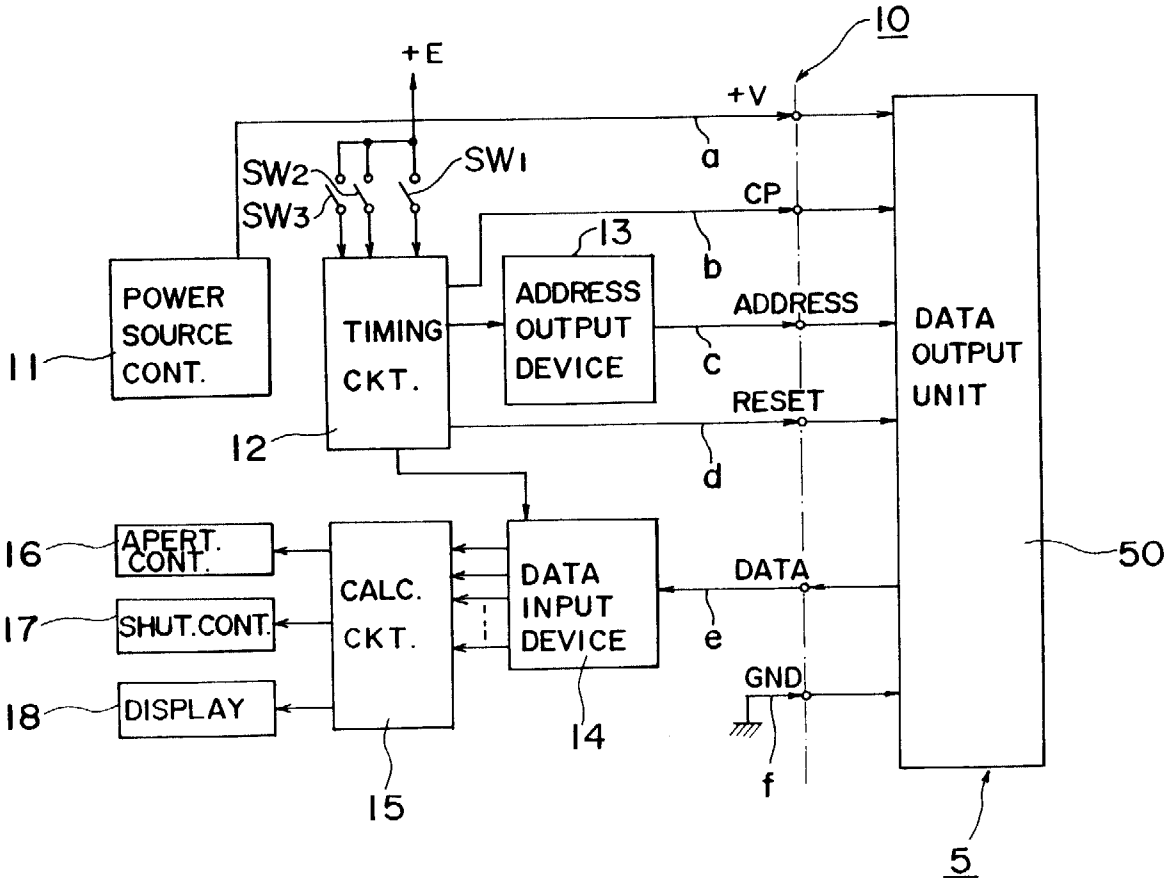
FIG. 2 is a block diagram showing a circuit construction at the side of a camera body in the camera system of FIG. 1, FIGS. 3(a) and 3(b) are block diagrams showing a circuit construction for part of a data input and output portion at the side of the camera body, and that for a data output device at the side of a camera accessory, with the circuit of FIG. 3(a) being coupled with the circuit of FIG. 3(b) through terminals c, b, a, f, d and e as indicated.

Reference is also made to FIG. 2 showing a block diagram of a central control unit 10 of the camera body 1 as coupled to the data output unit 50 of the interchangeable lens 5.

The central control unit 10 in FIG. 2 generally includes a power source control circuit 11 coupled, for example, to the data output unit 50 of the interchangeable lens 5 through the terminals a, parallel connection of switches SWl, SW2 and SW3 which are coupled with a timing circuit 12 which is connected to an address output device 13, and also, to the data output device 50 through the terminals b and d, with the address output device 13 being connected to the data output unit 50 through the terminal c, a data input device 14 connected to the data output unit 50 through the terminal e, and also, to the timing circuit 12 and a calculation circuit 15 which is further coupled to an aperture control device 16, a shutter control device 17 and a display unit 18 as shown.

The power source control circuit 11 supplies electric power to the data output unit 50 of the camera accessory, for example, the interchangeable lens 5 in this embodiment through the terminal a. The switch SW1 is arranged to be closed when the interchangeable lens 5 (referred to merely as a lens hereinbelow) is attached to the camera body 1. The switch SW2 is a release switch for starting an exposure control function, while the switch SW3 is a light measuring switch for starting a light measuring function, and these switches SW2 and SW3 are so arranged, for example, that the light measuring switch SW3 is closed at a first stage of depression of a shutter release button (not particularly shown), and the release switch SW2 is closed at a subsequent second stage of depression of the shutter release button. The light measuring switch SW3 may be of a type which is arranged, upon touching of the shutter release button by a finger of an operator, to be closed in response to electric current flowing through the finger or resistance variation of a pressure sensitive element produced by the pressure applied by the finger. The timing circuit 12 is arranged to apply timing signals to the address output device 13 and the data input device 14 based on the closing of the switches SWl, SW2 and SW3 for controlling timings of the address data output and the data input respectively, and also, to feed a train of reference clock pulses to the terminal b, and reset signal to the terminal d. The address output device 13 is controlled by the timing circuit 12, and successively produces address data serially per each bit from the terminal c. The data input device 14 is adapted to read the data specific to the respective camera accessories and successively input serially per each bit from the terminal e for conversion into parallel data to be fed to the calculation circuit 15, which calculates the data for exposure control, etc. based on the above data so as to be applied respectively to the aperture control device 16, shutter control device 17 and display device 18.

Table 1 given below shows examples of contents in ROM provided in each of the data output devices of the respective camera accessories for storing the data inherent in the camera accessories, while Table 2 denotes the relations between the above data produced from the ROM and the meanings represented by said data.

In Table 1, upper 2 bits (a6) and (a5) of the address data relate to data that show which camera accessory i.e. which ROM should be selected, and are represented by "10" when the selected camera accessory is an interchangeable lens, "01" when the selected camera accessory is an electronic flash, "11" if the selected camera accessory is a lens accessory such as an extension ring, bellows or the like, and "00", in the case of the motor-drive, although not particularly shown. The lower 5 bits (a4), (a3), (a2), (a1) and (a0) of the address data designate the address of ROM.

TABLE 1

Example of contents of ROM for each camera accessory

| Accessory address code a6 a5 | | | | | | 1 0 | | | | | | | | | | | | | | | | | |
|---|---|---|---|---|---|---|---|---|---|---|---|---|---|---|---|---|---|---|---|---|---|---|---|
| Data address code | | | | | Address | (Ex.) 50 mm F1.4 lens | | | | | | (Ex.) 135 mm F3.5 lens | | | | | | (Ex.) 28 mm F2 lens | | | | | |
| a4 | a3 | a2 | a1 | a0 | contents | Data code | | | | | Contents | Data Code | | | | | Contents | Data code | | | | | Contents |
| 0 | 0 | 0 | 0 | 0 | Check code | 1 | 1 | 1 | 0 | 0 | | 1 | 1 | 1 | 0 | 0 | | 1 | 1 | 1 | 0 | 0 | |
| 0 | 0 | 0 | 0 | 1 | Avo | 0 | 0 | 0 | 1 | 0 | F1.4 | 0 | 0 | 1 | 1 | 0 | F3.5 | 0 | 0 | 1 | 0 | 0 | F2 |
| 0 | 0 | 0 | 1 | 0 | Avmax | 0 | 1 | 1 | 1 | 1 | F16 | 1 | 0 | 0 | 0 | 1 | F22 | 1 | 0 | 0 | 0 | 1 | F22 |
| 0 | 0 | 0 | 1 | 1 | lens type | 0 | 0 | 0 | 0 | 0 | Distance present | 0 | 0 | 0 | 0 | 0 | Distance present | 0 | 0 | 0 | 0 | 1 | Distance absent |
| 0 | 0 | 1 | 0 | 0 | Focal length | 0 | 0 | 1 | 1 | 0 | 40–60 | 0 | 1 | 0 | 0 | 1 | 120–180 | 0 | 0 | 1 | 0 | 1 | 25–40 |
| 1 | 0 | 0 | 0 | 0 | | 1 | 1 | 1 | 1 | 1 | ∞ | 1 | 1 | 1 | 1 | 1 | ∞ | | | | | | |
| 1 | 0 | 0 | 0 | 1 | | 0 | 1 | 1 | 0 | 1 | 4 m | 1 | 0 | 1 | 1 | 0 | 19 m | | | | | | |
| 1 | 0 | 0 | 1 | 0 | | 0 | 1 | 0 | 0 | 1 | 2 | 1 | 0 | 0 | 1 | 1 | 11 | | | | | | |
| 1 | 0 | 0 | 1 | 1 | | 0 | 0 | 1 | 1 | 1 | 1.4 | 1 | 0 | 0 | 0 | 0 | 6.7 | | | | | | |
| 1 | 0 | 1 | 0 | 0 | | 0 | 0 | 1 | 1 | 0 | 1.2 | 0 | 1 | 1 | 1 | 1 | 5.6 | | | | | | |
| 1 | 0 | 1 | 0 | 1 | Data for | 0 | 0 | 1 | 0 | 1 | 1 | 0 | 1 | 1 | 1 | 0 | 4.5 | | | | | | |
| 1 | 0 | 1 | 1 | 0 | lens | 0 | 0 | 1 | 0 | 0 | 0.85 | 0 | 1 | 1 | 0 | 0 | 3.5 | | | | | | |
| 1 | 0 | 1 | 1 | 1 | exten- | 0 | 0 | 0 | 1 | 1 | 0.7 | 0 | 1 | 0 | 1 | 1 | 2.8 | | | | | | |
| 1 | 1 | 0 | 0 | 0 | sion | 0 | 0 | 0 | 1 | 0 | 0.6 | 0 | 1 | 0 | 1 | 1 | 2.8 | | | | | | |
| 1 | 1 | 0 | 0 | 1 | amount | 0 | 0 | 0 | 1 | 0 | 0.6 | 0 | 1 | 0 | 1 | 0 | 2.5 | | | | | | |
| 1 | 1 | 0 | 1 | 0 | | 0 | 0 | 0 | 0 | 1 | 0.5 | 0 | 1 | 0 | 1 | 0 | 2.5 | | | | | | |
| 1 | 1 | 0 | 1 | 1 | | 0 | 0 | 0 | 0 | 1 | 0.5 | 0 | 1 | 0 | 0 | 1 | 2 | | | | | | |
| 1 | 1 | 1 | 0 | 0 | | 0 | 0 | 0 | 0 | 1 | 0.5 | 0 | 1 | 0 | 0 | 1 | 2 | | | | | | |
| 1 | 1 | 1 | 0 | 1 | | 0 | 0 | 0 | 0 | 1 | 0.5 | 0 | 1 | 0 | 0 | 0 | 11 | | | | | | |
| 1 | 1 | 1 | 1 | 0 | | 0 | 0 | 0 | 0 | 1 | 0.5 | 0 | 1 | 0 | 0 | 0 | 1.7 | | | | | | |
| 1 | 1 | 1 | 1 | 1 | | 0 | 0 | 0 | 0 | 1 | 0.5 | 0 | 0 | 1 | 1 | 1 | 1.4 | | | | | | |

| Accessory address code a6 a5 | | | | | | 0 1 | | | | | | 1 1 | | | | | |
|---|---|---|---|---|---|---|---|---|---|---|---|---|---|---|---|---|---|
| Data address code | | | | | Address | (Ex.) Elec. flash A | | | | | | Address | (Ex.) Rear converter | | | | |
| a4 | a3 | a2 | a1 | a0 | Contents | Data code | | | | | Contents | Contents | Data code | | | | Contents |
| 0 | 0 | 0 | 0 | 0 | check code | 1 | 1 | 1 | 0 | 0 | | check code | 1 | 1 | 1 | 0 | 0 |
| 0 | 0 | 0 | 0 | 1 | GNO. mini | 0 | 0 | 0 | 1 | 0 | 1.4 | Kind of accessory | 0 | 0 | 0 | 1 | 1 Rear converter |
| 0 | 0 | 0 | 1 | 0 | GNO. max | 1 | 0 | 0 | 1 | 0 | 28 | | | | | | |
| 0 | 0 | 0 | 1 | 1 | Orientation characteristic | 0 | 0 | 0 | 0 | 1 | 45° 60° | | | | | | |
| 0 | 0 | 1 | 0 | 0 | Given below are | | | | | | | | | | | | |
| 1 | 0 | 0 | 0 | 0 | those re- | | | | | | | | | | | | |
| 1 | 0 | 0 | 0 | 1 | served | | | | | | | | | | | | |
| 1 | 0 | 0 | 1 | 0 | for other | | | | | | | | | | | | |
| 1 | 0 | 0 | 1 | 1 | informa- | | | | | | | | | | | | |
| 1 | 0 | 1 | 0 | 0 | tion | | | | | | | | | | | | |
| 1 | 0 | 1 | 0 | 1 | | | | | | | | | | | | | |
| 1 | 0 | 1 | 1 | 0 | | | | | | | | | | | | | |
| 1 | 0 | 1 | 1 | 1 | | | | | | | | | | | | | |
| 1 | 1 | 0 | 0 | 0 | | | | | | | | | | | | | |
| 1 | 1 | 0 | 0 | 1 | | | | | | | | | | | | | |
| 1 | 1 | 0 | 1 | 0 | | | | | | | | | | | | | |
| 1 | 1 | 0 | 1 | 1 | | | | | | | | | | | | | |
| 1 | 1 | 1 | 0 | 0 | | | | | | | | | | | | | |
| 1 | 1 | 1 | 0 | 1 | | | | | | | | | | | | | |
| 1 | 1 | 1 | 1 | 0 | | | | | | | | | | | | | |
| 1 | 1 | 1 | 1 | 1 | | | | | | | | | | | | | |

TABLE 2

List of data of contents in ROM

| Data code | | | | | Lens FNO. | Lens Distance | Lens type | Lens Focal length | Electronic flash GNO. | Electronic flash Orientation Characteristic | Winder Frame speed | Lens accessory Kind of accessory |
|---|---|---|---|---|---|---|---|---|---|---|---|---|
| 0 | 0 | 0 | 0 | 0 | F 1.2 | | Distance present | | 1.0 | 20° 28° | 1 Frame/sec. | |
| 0 | 0 | 0 | 0 | 1 | 1.4 | 0.5 m | Distance absent | | 1.2 | 45° 60° | 1.5 | Bellows |
| 0 | 0 | 0 | 1 | 0 | 1.7 | 0.6 | | Less than 8 mm | 1.4 | 53° 70° | 2 | Reverse adapter |
| 0 | 0 | 0 | 1 | 1 | 2 | 0.7 | | 8–17 | 2.0 | 60° 78° | 2.5 | Rear converter |
| 0 | 0 | 1 | 0 | 0 | 2.5 | 0.85 | | 17–25 | 1.7 | | 3 | Extension ring |
| 0 | 0 | 1 | 0 | 1 | 2.8 | 1 | | 25–40 | 2.8 | | 3.5 | |
| 0 | 0 | 1 | 1 | 0 | 3.5 | 1.2 | | 40–60 | 3.5 | | 4 | |
| 0 | 0 | 1 | 1 | 1 | 4 | 1.4 | | 60–90 | 4.0 | | 4.5 | |
| 0 | 1 | 0 | 0 | 0 | 4.5 | 1.7 | | 90–120 | 4.5 | | 5 | |
| 0 | 1 | 0 | 0 | 1 | 5.6 | 2 | | 120–180 | 5.6 | | 5.5 | |
| 0 | 1 | 0 | 1 | 0 | 6.7 | 2.5 | | 180–250 | 6.7 | | 6 | |
| 0 | 1 | 0 | 1 | 1 | 8 | 2.8 | | 250–450 | 8 | | 6.5 | |
| 0 | 1 | 1 | 0 | 0 | 9.5 | 3.5 | | 450–700 | 9.5 | | 7 | |
| 0 | 1 | 1 | 0 | 1 | 11 | 4 | | 700–1000 | 11 | | | |
| 0 | 1 | 1 | 1 | 0 | 13 | 4.5 | | More than 1000 | 13 | | | |
| 0 | 1 | 1 | 1 | 1 | 16 | 5.6 | | | 16 | | | |
| 1 | 0 | 0 | 0 | 0 | 19 | 6.7 | | | 19 | | | |
| 1 | 0 | 0 | 0 | 1 | 22 | 8 | | | 22 | | | |
| 1 | 0 | 0 | 1 | 0 | 27 | 9.5 | | | 28 | | | |
| 1 | 0 | 0 | 1 | 1 | 32 | 11 | | | 32 | | | |
| 1 | 0 | 1 | 0 | 0 | 40 | 13 | | | 40 | | | |
| 1 | 0 | 1 | 0 | 1 | 45 | 16 | | | 45 | | | |
| 1 | 0 | 1 | 1 | 0 | | 19 | | | | | | |
| 1 | 0 | 1 | 1 | 1 | | 22 | | | | | | |
| 1 | 1 | 0 | 0 | 0 | | 27 | | | | | | |
| 1 | 1 | 0 | 0 | 1 | | 32 | | | | | | |
| 1 | 1 | 0 | 1 | 0 | | 40 | | | | | | |
| 1 | 1 | 0 | 1 | 1 | | 45 | | | | | | |
| 1 | 1 | 1 | 0 | 0 | | 54 | | | | | | |
| 1 | 1 | 1 | 0 | 1 | | 64 | | | | | | |
| 1 | 1 | 1 | 1 | 0 | | 80 | | | | | | |
| 1 | 1 | 1 | 1 | 1 | | ∞ | | | | | | |

Subsequently, based on Tables 1 and 2 given above, input data in the case where various camera accessories are attached to the camera body will be described hereinbelow. By way of example, explanation will be given with reference to the case where an interchangeable lens capable of producing distance information corresponding to an amount of extension of the lens is attached to the camera body besides an interchangeable lens having a focal length of 50 mm, fully open aperture value of F1.4 and minimum aperture value of F16.

In the first place, as described earlier, it is when the upper 2 bits (a6) and (a5) of the address data are of "10" that the data inherent in or specific to a lens are produced from said lens. When the lower 5 bits (a4), and (a3), (a2), (a1) and (a0) become "00000", data "11100" for check code are produced from the interchangeable lens to show that said lens has been attached to the camera body 1. Therefore, if the data "11100" are input to the camera body upon designation of the address "1000000" from the camera body 1, it is ensured that the interchangeable lens has been attached. Similarly, as shown in Table 1, if the data "11100" are applied to the camera body 1 upon designation of the address "0100000", it is indicated that an electronic flash has been attached to the camera body 1, and when the data "11100" are applied to the camera body 1 upon designation of the address "1100000", it is shown that a lens accessory has been mounted on the camera body 1.

In the next step, when the address of "1000001" is designated, the address for the ROM in which data for the full aperture value Av0 are stored is to be designated, and the data "00010" for the fully open aperture value at F1.4 are fed to the camera body 1. Subsequently, when the address of "1000010" is designated, data "01111" for the minimum aperture value $Av_{max}$, for example, at F16 are fed to the camera body 1. The above data are equivalent to the aperture value F16 as shown in Table 2. Upon designation of the address for "1000011", there is produced a signal indicating whether or not the interchangeable lens mounted on the camera body 1 is of a lens arranged to produce the distance information described earlier. For example, in the case of the lens of F1.4 with a focal length of 50 mm in Table 1, data of "00000" are produced, since said lens is capable of producing the distance information, while in the case of a lens of F2.0 with a focal length of 28 mm, data of "00001" are produced, since no distance information is produced therefrom.

Subsequently, when the address "1000100" is designated, the address of the ROM in which the data of the focal length have been stored is to be designated, and since the focal length is 50 mm in the case of the lens of 50 mm F1.4, data "00110" indicating that the focal length is within the range of 40 to 60 mm are produced. Moreover, data for the amount of extension of the lens to be described later are employed as the address data of the ROM for said lens, and based on the above address data, the distance information referred to earlier is produced. It the data for the lens extension amount are "10000", address of "1010000" is designated so as to produce data "11111" corresponding to an infinite distance, and if the lens extension amount data are "11111", address for "1011111" is designated for producing data "00111" corresponding to a distance of 1.4 m.

Meanwhile, in the case where the flash source, e.g. electronic flash is attached to the camera body, if the address of "0100000" is designated, in the similar manner as in the case of the interchangeable lens, check code "11100" is applied to the camera main body, and thus, it is ensured that the electronic flash has been attached to the camera body. Subsequently, address of "0100001" is designated, in which address, the data for the minimum guide number are stored so as to produce, for example, data for the minimum guide member 14. In the next step, when address of "0100010", in which, data for the maximum guide number are stored, is designated, for example data "10010" for the guide number 28 are produced. Thereafter, if the address of "0100011", in which, data for orientation characteristic are stored, is designated, data of "00001" are produced in this instance. The data indicate that angles are 45° in a longitudinal direction and 60° in a lateral direction.

In the case where a lens accessory has been mounted to the camera body, the check code of "11100" is applied to the camera body upon designation of the address "1100000" for the confirmation that the lens accessory has been attached to the camera body, while, when the data "00011" are applied upon designation of the address "1100001", it is ensured that a tele-converter i.e. rear converter has been attached. Similarly, as shown in Table 2, it may be ensured that a bellows has been attached to the camera body, if the data are "00001", a reverse adaptor, if the data are "00010", and an extension ring, if the data are "00100".

Although not particularly shown in Table 1, if a winder (or motor-drive) is mounted on the camera body, the winder applies data specific to the winder to the camera body, if the upper 2 bits (a6) and (a5) are "00". In the similar manner as in the other camera accessories, upon designation of the address "0000000", the check code "11100" is applied to the camera body, and when the address of "0000001" is designated, data for the number of frames which can be exposed for photographing per second are input. As shown in Table 2, if the data are "00000", the number of frames is one frame/sec. and if the data are "01100", the number of frames will be seven frames/sec.

Figure 3A:
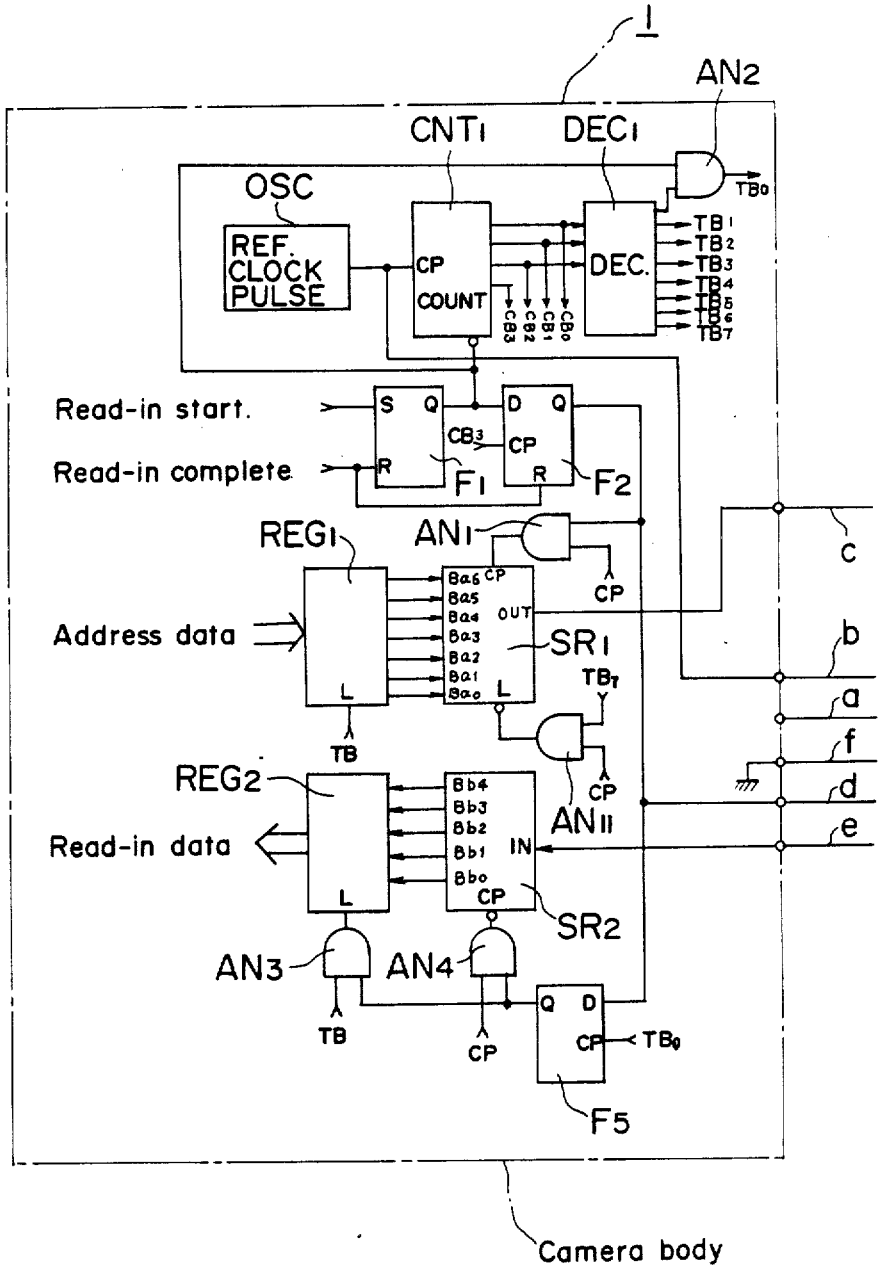
Figure 3B:
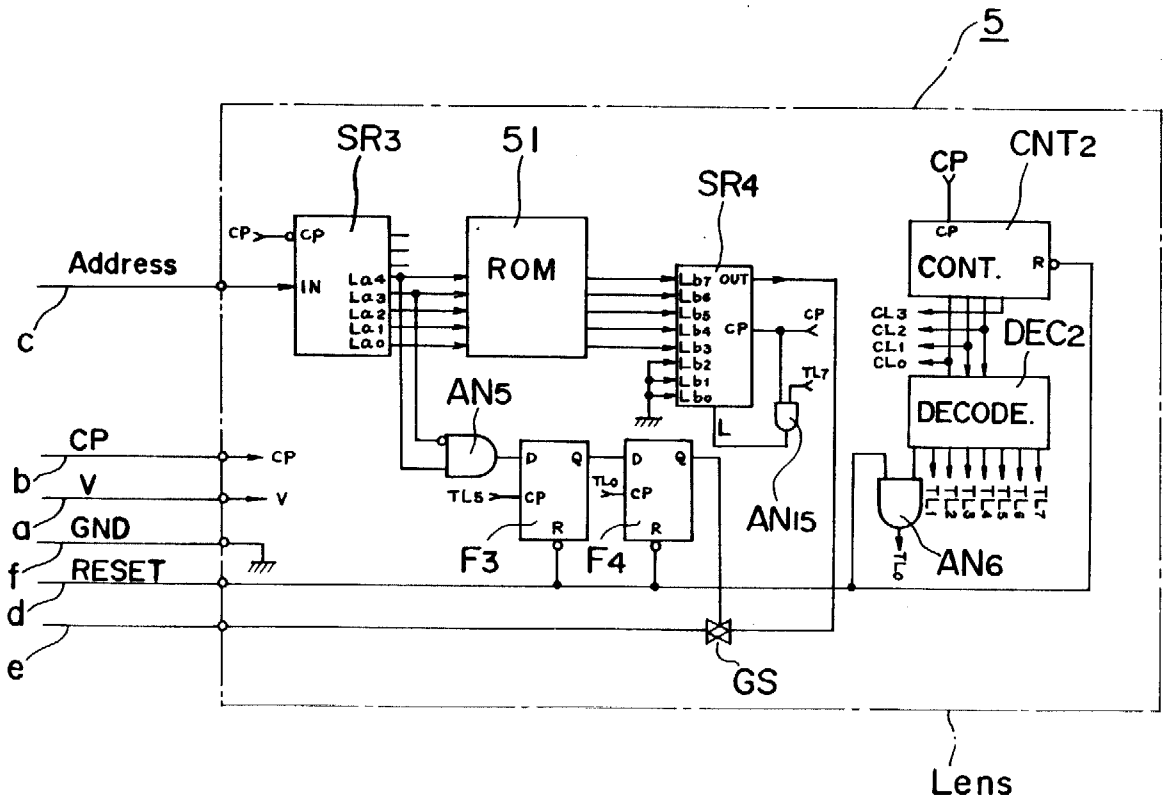
Figure 4:
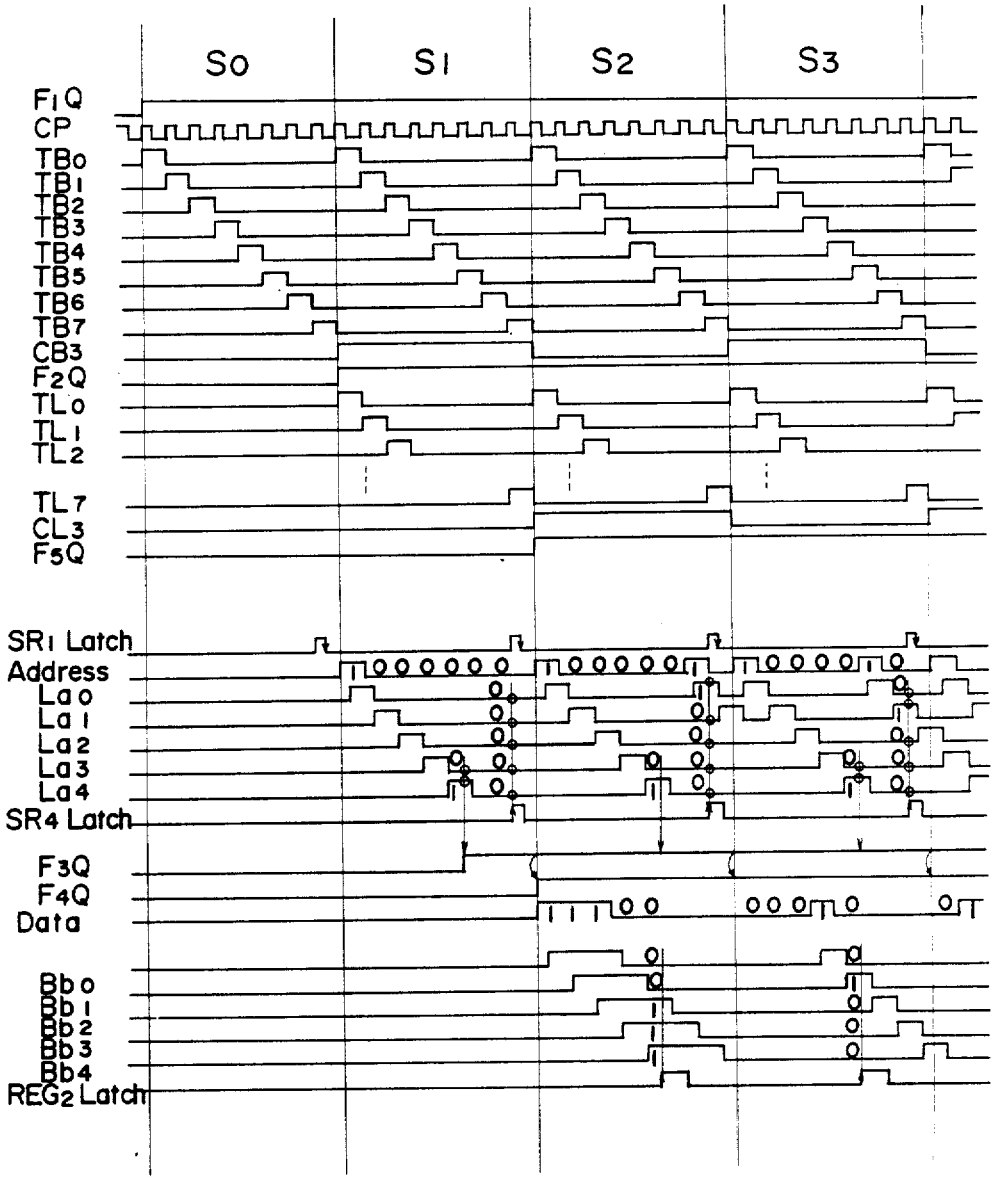
FIG. 4 is a time-chart explanatory of the functionings of the arrangement of FIGS. 3(a) and 3(b)

Reference is made to FIGS. 3(a) and 3(b) showing a circuit diagram representing part of a circuit for the address output device 13 and part of a circuit for the data input device 14 at the side of the camera body 1, and a specific example of the data output device at the side of the camera accessory, which is an interchangeable lens 5 in this embodiment by way of example, and also to FIG. 4 showing a time-chart for explaining functionings of the arrangement of FIGS. 3(a) and 3(b).

In FIGS. 3(a) and 3(b), there is provided at the side of the camera body 1, a reference clock pulse output circuit OSC which is coupled to a decoder DEC 1 through a counter CNT 1, and also to the lens 5 through a terminal b. A train of clock pulses CP (FIG. 4) from the circuit OSC are applied to the counter CNT 1 and also to the lens 5 via said terminal b. The counter CNT 1 is arranged to count the clock pulses CP, while the decoder DEC 1 decodes data from outputs CB0, CB1 and CB2 of said counter CNT 1, which serve as timing signals TB0 to TB7 shown in FIG. 4. On the other hand, at the side of the interchangeable lens 5 (FIG. 3(b), there are provided a counter CNT 2 and a decoder DEC 2 coupled to each other, and having constructions generally similar to those of the counter CNT 1 and the decoder DEC 1 provided at the side of the camera body 1. The outputs of the decoder DEC 2 form timing signals TL0 to TL7 shown in FIG. 4. Since the outputs of the two decoders DEC 1 and DEC 2 decode the outputs of the counters CNT 1 and CNT 2 which count the same clock pulses CP, similar timing signals are produced therefrom for synchronization of the circuits at the sides of the camera body 1 and the lens 1.

Table 3 given below shows the relation of outputs between the counters CNT 1 and CNT 2 and the decoders DEC 1 and DEC 2.

TABLE 3

| Counter (CNT 1), (CNT 2) | | | | Decoders (DEC 1), (DEC 2) | | | | | | | | |
|---|---|---|---|---|---|---|---|---|---|---|---|---|
| CB0 CL0 | CB1 CL1 | CB2 CL2 | CB3 | TB0 TL0 | TB1 TL1 | TB2 TL2 | TB3 TL3 | TB4 TL4 | TB5 TL5 | TB6 TL6 | TB7 TL7 | Step |
| 0 | 0 | 0 | 0 | 1 | 0 | 0 | 0 | 0 | 0 | 0 | 0 | S0 |
| 1 | 0 | 0 | 0 | 0 | 1 | 0 | 0 | 0 | 0 | 0 | 0 | |
| 0 | 1 | 0 | 0 | 0 | 0 | 1 | 0 | 0 | 0 | 0 | 0 | |
| 1 | 1 | 0 | 0 | 0 | 0 | 0 | 1 | 0 | 0 | 0 | 0 | |
| 0 | 0 | 1 | 0 | 0 | 0 | 0 | 0 | 1 | 0 | 0 | 0 | |
| 1 | 0 | 1 | 0 | 0 | 0 | 0 | 0 | 0 | 1 | 0 | 0 | |
| 0 | 1 | 1 | 0 | 0 | 0 | 0 | 0 | 0 | 0 | 1 | 0 | |
| 1 | 1 | 1 | 0 | 0 | 0 | 0 | 0 | 0 | 0 | 0 | 1 | |
| 0 | 0 | 0 | 1 | 1 | 0 | 0 | 0 | 0 | 0 | 0 | 0 | S1 |
| 1 | 0 | 0 | 1 | 0 | 1 | 0 | 0 | 0 | 0 | 0 | 0 | |
| 0 | 1 | 0 | 1 | 0 | 0 | 1 | 0 | 0 | 0 | 0 | 0 | |
| 1 | 1 | 0 | 1 | 0 | 0 | 0 | 1 | 0 | 0 | 0 | 0 | |
| 0 | 0 | 1 | 1 | 0 | 0 | 0 | 0 | 1 | 0 | 0 | 0 | |
| 1 | 0 | 1 | 1 | 0 | 0 | 0 | 0 | 0 | 1 | 0 | 0 | |
| 0 | 1 | 1 | 1 | 0 | 0 | 0 | 0 | 0 | 0 | 1 | 0 | |
| 1 | 1 | 1 | 1 | 0 | 0 | 0 | 0 | 0 | 0 | 0 | 1 | |

When a read-in start signal is produced in the camera body 1, a flip-flop F1 connected to the counter CNT 1 and another flip-flop F2 is set (FlQ in FIG. 4), with the counter CNT 1 released from the reset state, whereby the counter CNT 1 starts counting of the clock pulses, while the decoder DEC 1 starts producing the timing signals TB0 to TB7. It is to be noted here that, since the outputs of the decoders DEC 1 and DEC 2 to AND circuits AN2 and AN6 respectively coupled therewith are "High" when the outputs of the counters CNT 1 and CNT 2 are "000", the AND circuits AN2 and AN6 are so arranged that the timing signals TB0 and TL0 of "High" level are output only after the starting of the counting by the counters CNT 1 and CNT 2.

Firstly, in a step S0 in FIG. 4 (i.e. a period from output of the read-in start signal to output of the first timing signal TB7), the address data "1000000" are latched in a register REG 1 coupled with a shift register SR1 which is connected to the flip-flop F2 through an AND circuit AN1, and also to an AND circuit AN11, and further to a shift register SR3 provided at the side of the lens 5 via a terminal c, at the timing by which the timing signal TB1 rises to "High", while said data are further latched in the shift register SR1 at the timing by which the output of the AND circuit AN11 falls to "LOW", with the timing signal of TB7 being produced. During the period for the above step S0, other circuits are out of functionings, since Q output of the flip-flop F2 (F2Q in FIG. 4) is "LOW". When the step S0 is shifted to a step Sl, i.e. upon counting of a ninth clock pulse CP, the D input of the flip-flop F2 is taken in due to rising of the output CB3 of the counter CNT 1 to "High" (CB3 in FIG. 4), with the output Q of the flip-flop F2 becoming "High" (F2Q in FIG. 4), whereby the AND circuit AN1 is enabled to feed the clock pulses to the shift register, while the circuit at the side of the interchangeable lens 5 is released from the reset state through a terminal d. The shift register SR1 successively produces serially per one bit, the earlier described address data "1000000" latched in synchronization with the positive edge of the clock pulses from the terminal c. The data thus produced are successively taken into the shift register SR3 at the side of the interchangeable lens 5 in synchronization with the negative edge of the clock pulses so as to be sequentially produced from terminals La0, La1, La2, La3 and La4 (La0 to La4 in FIG. 4) of the shift register SR3. Thus, at the timing by which a terminal TL5 for a flip-flop F3 coupled with a flip-flop F4 and connected, at its D input, to the terminals La4 and La3 through an AND gate AN5, becomes "High", the outputs of the terminals La4 and La3 become "10", with the output of the AND circuit AN5 assuming a "High" state, and thus, the Q output of the flip-flop F3 receiving the above output at its D input becomes "High" (F3Q in FIG. 4).

At the positive edge of the signal at the terminal TL7 of the decoder DEC 2 on the side of the lens 5, the data of the output terminals La4, La3, La, La1 and La0 of the shift register SR3 bears the data of the lower 5 bits ("00000" in the case of the step S1) of the address data, and thus, the address "00000" of the ROM 51 is designated. By the above address designation, the data for the check code "11100" earlier described are produced from the ROM 51.

The above data from the ROM 51 are latched in the shift register SR4 due to a positive edge at a terminal TL7.

Since the Q output of the flip-flop F3 has become "High" at the time point of the timing pulse TL5, when the subsequent timing pulse TL0 rises to "High", the flip-flop F4 takes in the Q output of the flip-flop F3 to render said Q output to be "High" (F4Q in FIG. 4), whereby a switch circuit GS coupled to said Q output and the output of the shift register SR4 and also, to the input of a shift register SR2 at the side of the camera body through a terminal e is conducted, and thus, the above data "11100" are brought into a state where they may be produced from the terminal e.

The data taken in the shift register SR4 are applied to the terminal e in the order of "11100" through said switch circuit GS in synchronization with the clock pulses, and at the side of the camera body 1, the above data are taken into the shift register SR2 (Bb0 to Bb4 in FIG. 4) in synchronization with the negative edge of the clock pulses. In the above case, since the Q output of the flip-flop F2 has become "High", a flip-flop F5 connected to the flip-flop F2, and to the shift register SR2 and a register REG 2 through AND circuits AN3 and AN4 respectively, has its Q output at "High" when the subsequent timing pulse TB0 rises to "High" (positive edge of TB0 at the step S2). Accordingly, after the step S2, the AND circuits AN3 and AN4 are enabled, and at the positive edge of pulse TB5, the output of the shift register SR2 is latched in the register REG 2.

In the step S2, the data "11100" as described above are taken in, and simultaneously, the subsequent address data "1000001" are transferred to the interchangeable lens 5, while, in a step S3, the lens data "00010" by the above address designation are transferred to the camera body 1, and also, the subsequent address data "1000010" are transferred to the lens 5. Thereafter, addresses and data are successively transferred in a similar manner.

Figure 5:
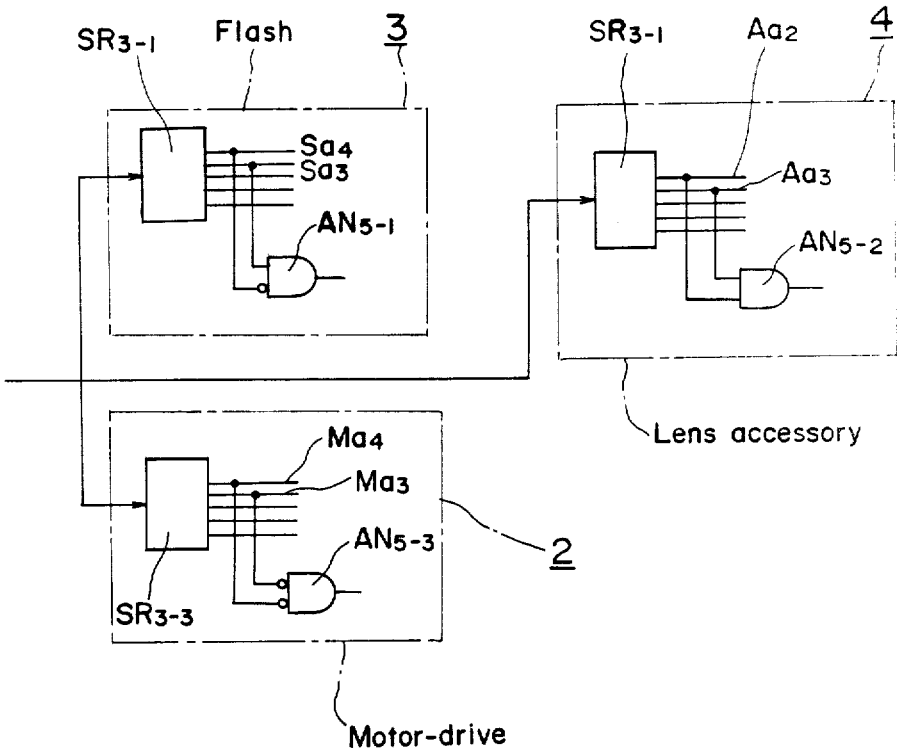
FIG. 5 is a circuit connection diagram showing an example of connections to other camera accessories.

As shown in Table 1, since the upper address of the lens is "10", this is arranged to be judged by the data output device 50 of the lens 5 for conduction of the switch circuit GS, but in the case of other camera accessories such as the electronic flash, lens accessories, motor-drive, etc., input voltage level for the input terminal of an AND circuit AN5 is transformed in correspondence with each accessory as shown in FIG. 5. More specifically, arrangements are so made that, in the case of an electronic flash, the upper address data are "01", and therefore, upon input of this signal, the output of an AND circuit $AN_{5-1}$ becomes "High", and in the case of a lens accessory, since the address data are "11", the output of an AND circuit $AN_{5-2}$ becomes "High", while in the case of a motor-drive, the address data are "00", and therefore, the output of an AND circuit $AN_{5-3}$ becomes "High". Other circuit constructions in these accessories are generally similar to those in the interchangeable lens 5.

In the circuit arrangement of FIG. 3, it is necessary to provide six terminals in total between the camera body 1 and the interchangeable lens 5, i.e. the clock pulse terminal b, address data terminal c, power source terminal a, ground terminal f, reset terminal d, and data terminal e. However, the number of such connecting terminals should preferably be as small as possible. Therefore, in a modification shown in FIGS. 6(a) and 6(b) and 7(a) and 7(b), the number of terminals is reduced by one through common use of the terminals c and e for the address data and the data. Meanwhile, in another modification shown in FIGS. 8(a) and 8(b), and 9 and 10, the number of terminals is similarly reduced by one through common use of the terminals for the address data and the resetting.

Figure 6A:
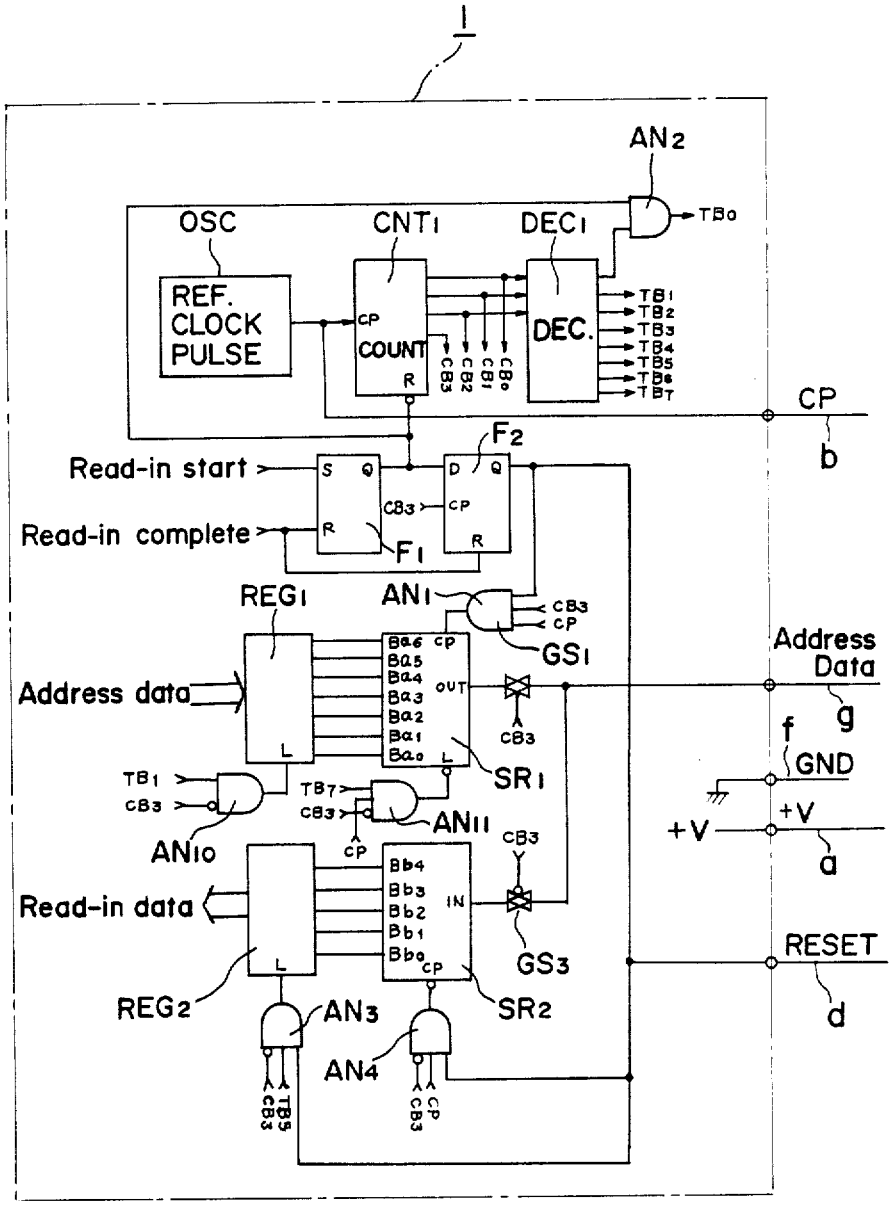
FIGS. 6(a) and 6(b) are block diagrams similar to FIGS. 3(a) and 3(b), which particularly show a modification thereof, with the circuit of FIG. 6(a) being coupled with the circuit of FIG. 6(b) through terminals b, g, f, a and d as indicated.
Figure 6B:
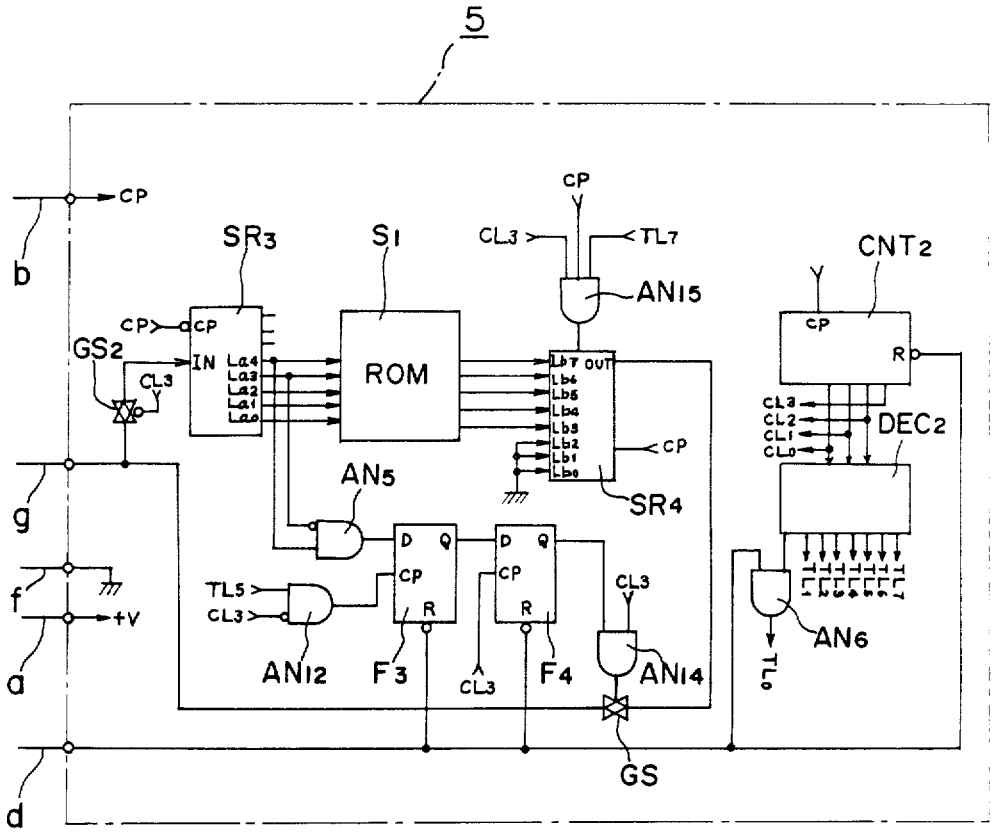
Figure 7:
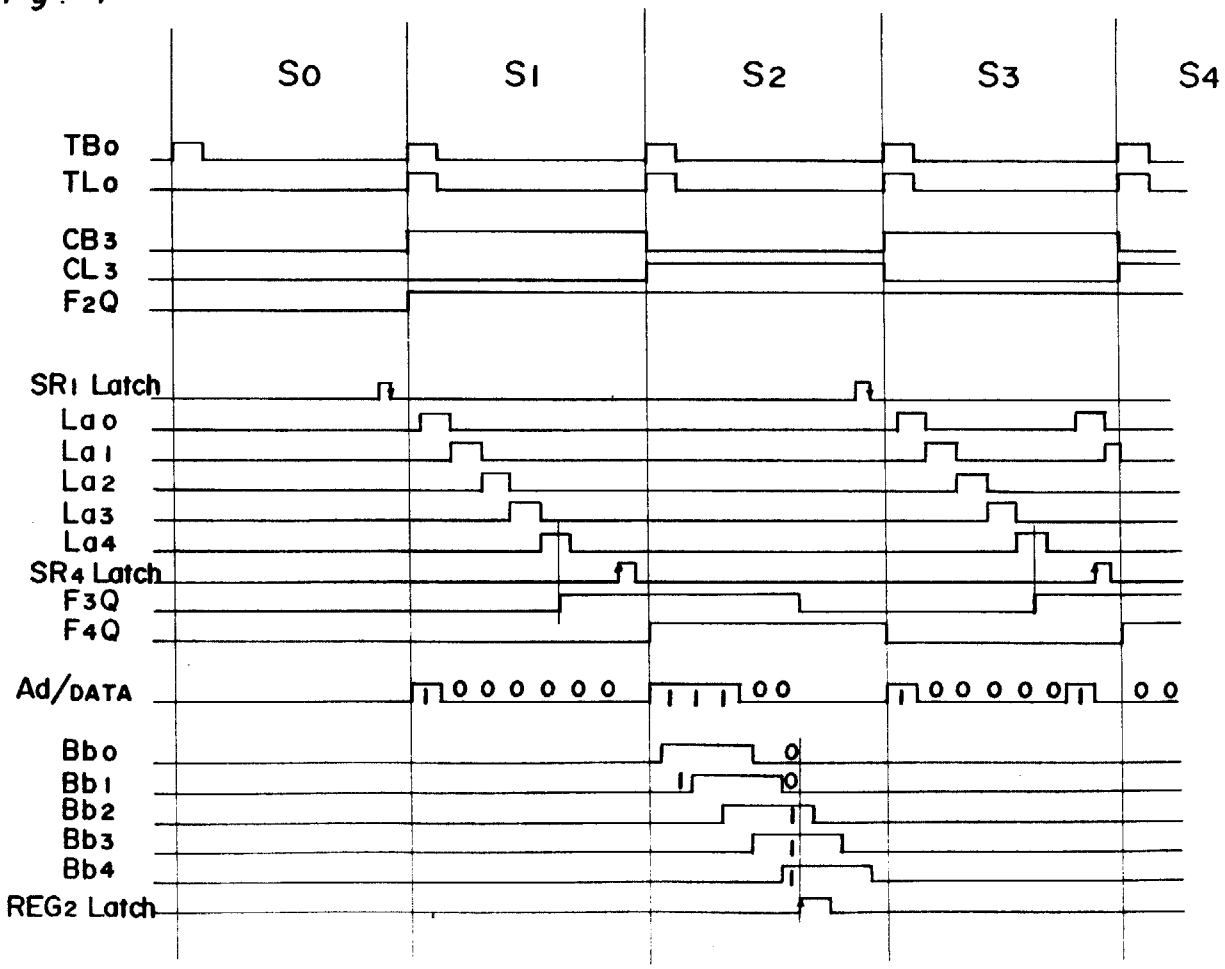
FIG. 7 is a time-chart explanatory of functionings of the arrangement of FIGS. 6(a) and 6(b), FIGS. 8(a) and 8(b) are block diagrams similar to FIGS. 3(a) and 3(b) which particularly show another modification thereof, with the circuit of FIG. 8(a) being coupled with the circuit of FIG. 8(b) through terminals b, h, f, a and e as indicated.

Although the circuit constructions in FIGS. 6(a) and 6(b) are fundamentally similar to those in FIGS. 3(a) and 3(b), with like parts being designated by like reference symbols and numerals, since the address data transfer line and data transfer line are arranged to be common at a terminal g, there is added a circuit for changing over the timings for delivery of the addresses and the data, and it is so arranged that, to the terminal g, the address data are fed when the terminal CB3 of the counter CNT 1 is "High" (steps S1, S3, S5, . . .), while the data of the camera accessories are applied, when the terminal CL3 of the counter CNT 2 is "High" (steps S2, S4, S6, . . .).

In the step S0, the address data are latched in the register REG 1 at the time point where the timing signal TB1 rises "High" in the similar manner as in FIGS. 3(a) and 3(b) and further, the address data from the register REG 1 are latched in the shift register SR1 at the time point where the output of the AND circuit AN11 falls "Low". In the next step S1, a switch circuit GS1 inserted between the output of the shift register SR1 and the terminal g and further coupled with the input of the shift register SR2 through a switch circuit GS3, is conducted, since the terminal CB3 of the counter CNT 1 becomes "High", and in synchronization with the clock pulses from the AND circuit AN1, the address data latched in the shift register SR1 are successively output to the terminal g per one bit. In the above case, the switch circuit GS3 is in a state of non-conduction contrary to the above switch circuit GS1, and there is no possibility that the address data are input to the shift register SR2. The address data applied to the lens 5 through the terminal g are sequentially fed into the shift register SR3 (La0 to La4 in FIG. 7) due to conduction of a switch circuit GS2 inserted between the terminal g and the input of said shift register SR3, owing to the "Low" state of the terminal CL3 of the counter CNT 2, and by signal from the AND circuit $AN_{15}$ coupled to the shift register SR4 at the positive edge at the terminal TL7 of the decoder DEC2, data from the ROM 51 are latched in the shift register SR4 (SR4 Latch in FIG. 7). Meanwhile, by the timing at which the timing pulse TL5 becomes "High", the output of an AND circuit $AN_{12}$ coupled to the flip-flop F3 rises, and in this case, if the upper 2 bits of the address data are of "10", the Q output of the flip-flop F3 becomes "High" (F3Q in FIG. 7), since the output of the AND circuit AN5 is in the state of "High". In the step S2, the terminal CL3 of the counter CNT 2 becomes "High" (CL3 in FIG. 7), with the terminal CB3 of the counter CNT 1 becoming "Low" (CB3 in FIG. 7). When the terminal CL3 becomes "High", the switch circuit GS2 is rendered to be non-conductive, while, by the rising of the terminal CL3 to "High", the flip-flop F4 takes in the D input, i.e. the Q output of the flip-flop F3 and thus, the Q output of the flip-flop F4 becomes "High" (F4Q in FIG. 7). Accordingly, the output of an AND circuit $AN_{14}$ inserted between the Q output of the flip-flop F4 and the switch circuit GS becomes "High" for conduction of said switch circuit GS so as to allow the data from the shift register SR4 to be applied to the terminal g. On the other hand, due to falling of the output of the terminal CB3 of the counter CNT 1 to "Low", the switch circuit GS1 becomes non-conductive, with the switch circuit GS3 being conducted. Thus, in synchronization with the clock pulses from the AND circuit AN4, the shift register SR2 takes in the data from the shift register SR4 (Bb0 to Bb4 in FIG. 7), and by the rising signal of the terminal TB5 through the AND circuit AN3, the data taken in the shift register SR2 are latched in the register REG 2 (REG 2 Latch in FIG. 7). Meanwhile, at the step S2, since the subsequent address data are taken in the shift register SR1 at the timing of falling of clock pulses when the terminal TB7 becomes "High", the address is applied from the terminal g to the lens 5 at the step S3, and thereafter, functionings similar to those in the previous steps S1 and S2 are repeated.

Figure 8A:
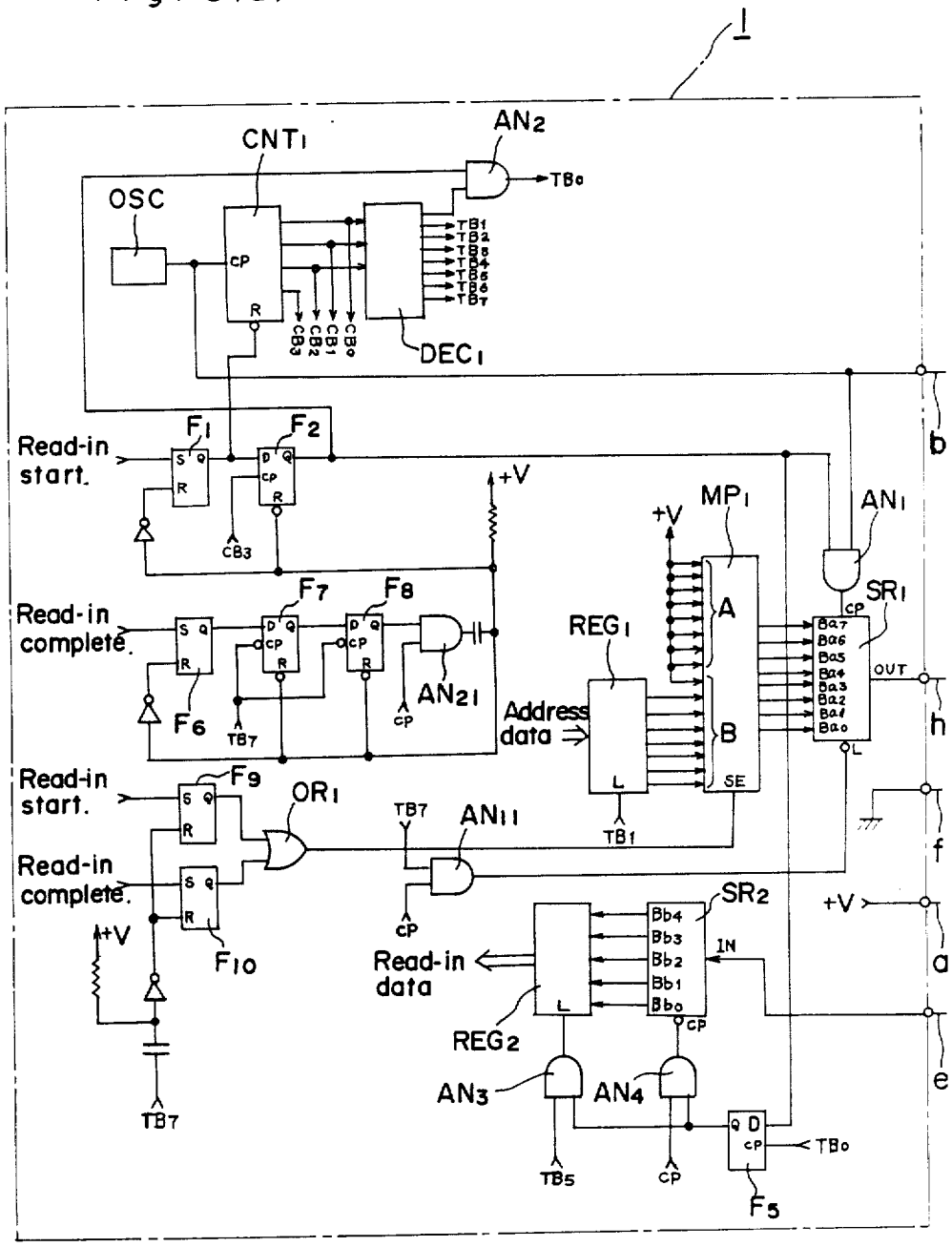
Figure 8B:
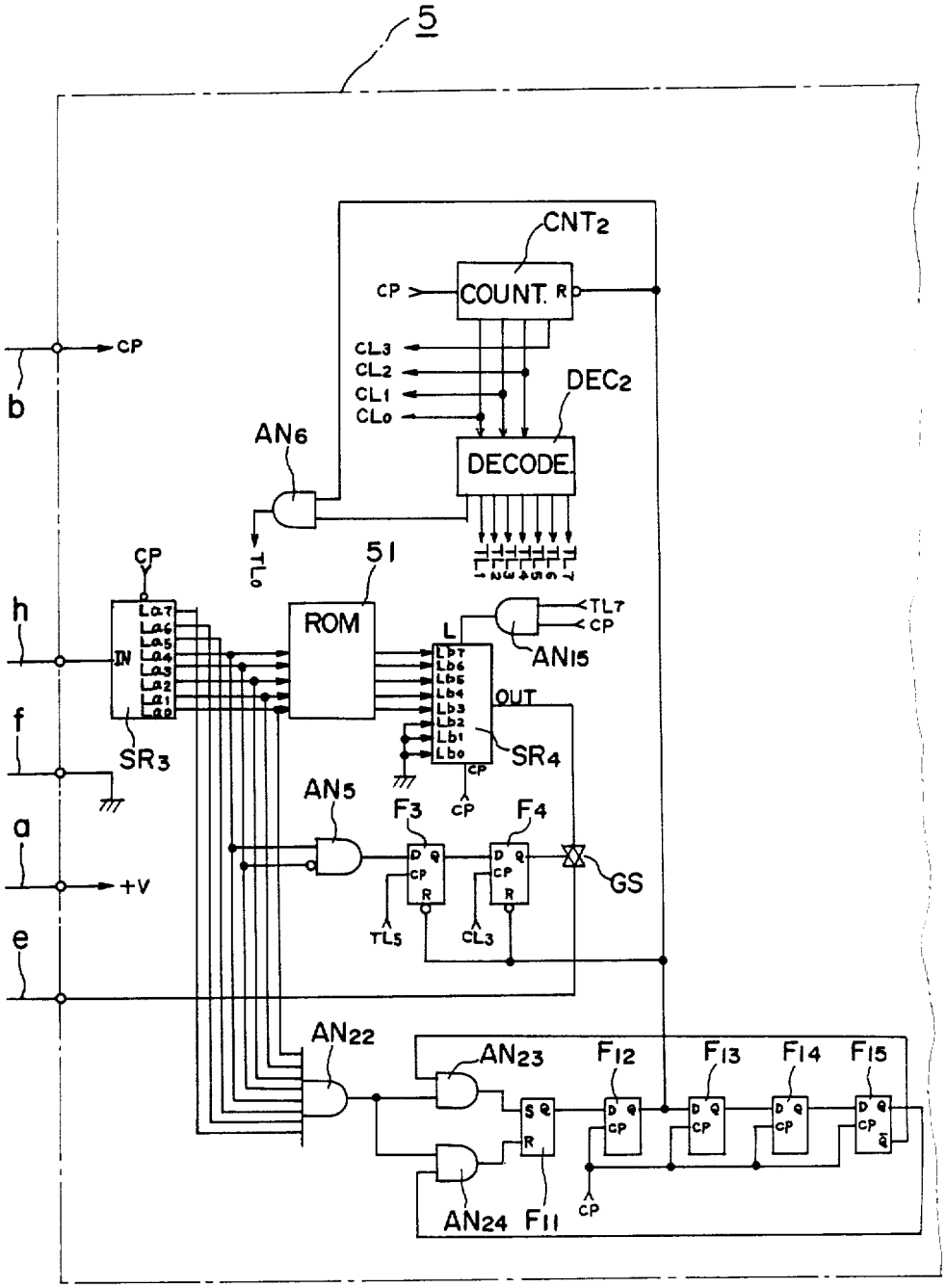
Figure 9:
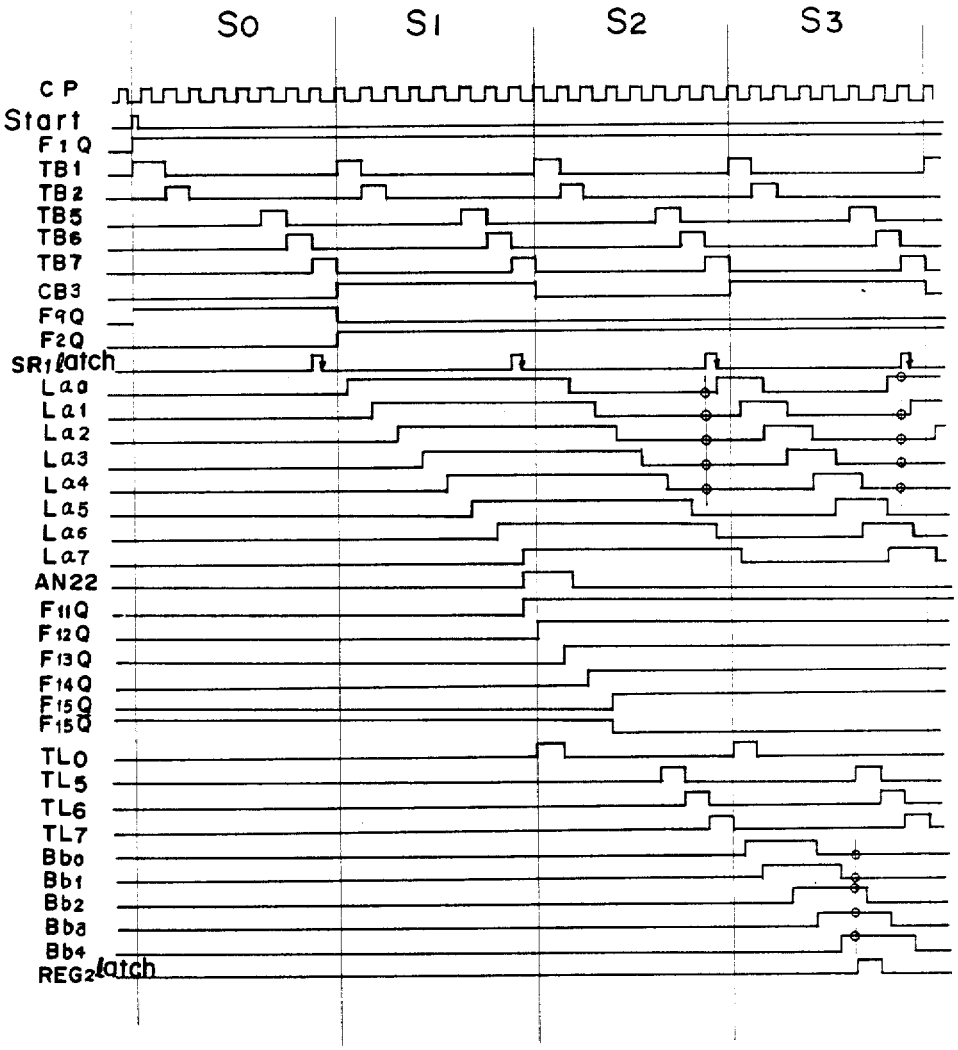
FIGS. 9 and 10 are time-charts explanatory of functionings of the arrangement of FIGS. 8(a) and 8(b), FIGS. 11(a) and 11(b) are block diagrams similar to FIGS. 3(a) and 3(b), which particularly show still another modification thereof, with the circuit of FIG. 11(a) being coupled with the circuit of FIG. 11(b) through terminals b, f, a and i as indicated.
Figure 10:
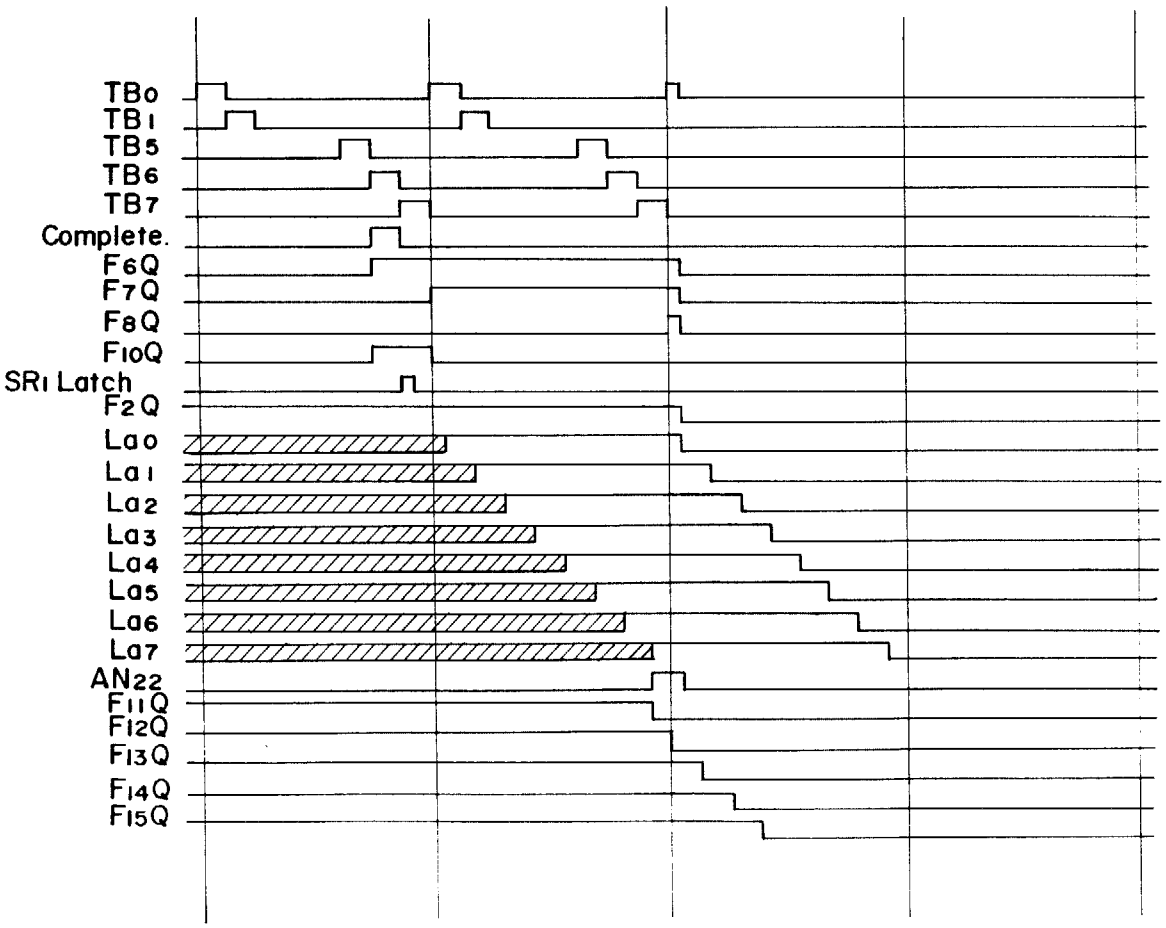

In FIGS. 8(a) and 8(b), there is shown one example of the circuit construction in which the address data transfer line c and the reset signal line d in FIGS. 3(a) and 3(b) are replaced by a common line h, while FIGS. 9 and 10 illustrate time-charts for the circuit arrangement of FIGS. 8(a) and 8(b).

In the arrangement of FIGS. 8(a) and 8(b), upon input of the read-in start signal (start in FIG. 9), the flip-flop F1, and a flip-flop F9 coupled with a flip-flop F10 and connected, through an OR circuit OR1, to a multiplexer MP1 inserted between the register REG 1 and the shift register SR1, are set (F1Q, F9Q set in FIG. 9) for starting functions. As the Q output of the flip-flop F9 becomes "High", the output of the OR circuit OR1 also becomes "High", and the multiplexer MP1 produces as an output, the input "11111111" from its portion A, and this output is latched in the shift register SR1 by the falling (SR1 Latch in FIG. 9) of the output of an AND circuit AN11 connected to said shift register SR1. Since the flip-flop F9 is reset (F9Q in FIG. 9) by the negative edge of the timing pulse TB7, the multiplexer MP1 thereafter produces the ordinary address data (output of the register REG 1) from a portion B. It is to be noted here that the data "11111111" from the portion A of the multiplexer MP1 are the data not corresponding to the address of any of the camera accessories, and therefore, by judging the input of the above data, the circuit in the camera accessory 5 is to be released from the reset state.

The data latched in the shift register SR1 are successively produced from the terminal h per bit based on the clock pulses from the AND circuit AN1 so as to be taken into the shift register SR3 at the side of the interchangeable lens 5 (La0 to La7 in FIG. 9). Thus, when the terminal La7 has become "High", all the outputs of the shift register SR3 become "High", and the output of an AND circuit AN22 coupled to the shift register SR3 and the ROM 51 rises to "High", and in this case, a flip-flop F15 coupled to the AND circuit AN22 through flip-flops F14, F13, F12 and F11 and AND gates AN23 and AN24 as shown, is reset. Since the $\overline{Q}$ output thereof is "High", the output of the AND circuit AN23 rises to set the flip-flop F11 (F11Q in FIG. 9). Thus, the Q output of the flip-flop F12 becomes "High" by the positive edge of the next clock pulse (F12Q in FIG. 9) whereby the circuit is released from the reset state. Subsequently, by the positive edge of the clock pulses, the Q outputs of the flip-flops F13, F14 and F15 sequentially become "High" (F13Q, F14Q, F15Q in FIG. 9). As the Q output of the flip-flop F15 becomes "High" and the $\overline{Q}$ output thereof becomes "Low", the AND circuit AN23 is disabled, with the AND circuit AN24 being enabled on the contrary, and upon subsequent rising of the output from the AND circuit AN22 to "High", the flip-flop F11 is brought into a state for resetting. Subsequently, reception and delivery of the address and data are effected in the similar manner as in FIGS. 3(a) and 3(b).

The read-in completion signal is produced by the timing signal TB6 as described later, whereby the flip-flop F10 is set (F10Q in FIG. 10), and the data "11111111" from the portion A are produced from the multiplexer MP1. The above data are latched in the shift register SR1 by the output of the AND circuit AN11 (SR1 Latch in FIG. 10) so as to be fed from the terminal h to the shift register SR3 at the side of the lens 5. When the output of the AND circuit AN22 becomes "High" (AN22 in FIG. 10), since the AND circuit AN24 is enabled as described earlier, the flip-flop F11 is reset (F11Q in FIG. 10), and the Q output of the flip-flop F12 becomes "Low" by the next clock pulse (F12Q in FIG. 10) to bring the circuit at the side of the lens 5 into a reset state. Thus, the Q outputs of the flip-flops F13, F14 and F15 sequentially become "Low" based on the clock pulses (F13Q, F14Q, F15Q in FIG. 10). It should be noted here that hatched portions La0 to La7 in FIG. 10 show that these outputs may take any of the "High" and "Low" states, but since there is no possibility that all become "High" except for the time for outputting the read-in signal completion signal, the above functioning is not affected.

On the other hand, at the side of the camera body 1, upon input of the read-in completion signal, a flip-flop F6 coupled to the flip-flops F1 and F2 through flip-flops F7 and F8 and an AND circuit AN21 via a capacitor as shown, is set (F6Q in FIG. 10), and by the negative edge of the next timing pulse TB7, the Q output of the flip-flop F7 becomes "High" (F7Q in FIG. 10), and further, by the negative edge of the subsequent timing pulse TB7, the Q output of the flip-flop F8 becomes "High" (F8Q in FIG. 10). Thus, clock pulse is output from the AND circuit AN21, and by the negative edge of this clock pulse, the flip-flops F1, F2, F6, F7, F8 and counter CNT 1 are reset, with the circuit at the side of the camera body 1 being also reset to wait for the subsequent read-in start signal to be input.

In the foregoing embodiment of FIGS. 6(a) and 6(b), the address data transfer line and the data transfer line are combined for common use, while in the embodiment of FIG. 8, the address data transfer line and the reset signal line are replaced by the common line so as to reduce the number of electrical connecting terminals between the camera body 1 and the camera accessory to five pieces.

Figure 11A:
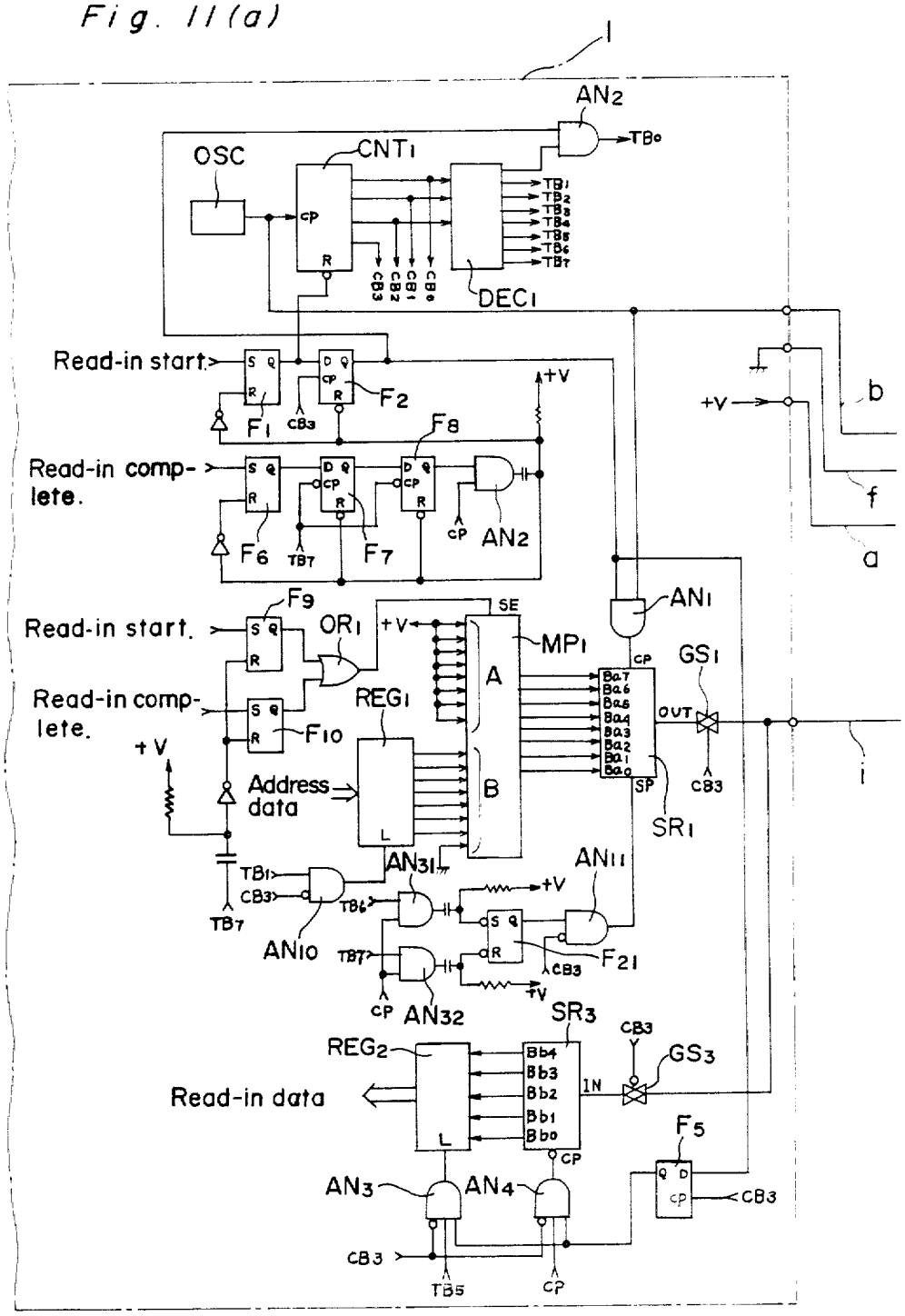
Figure 11B:
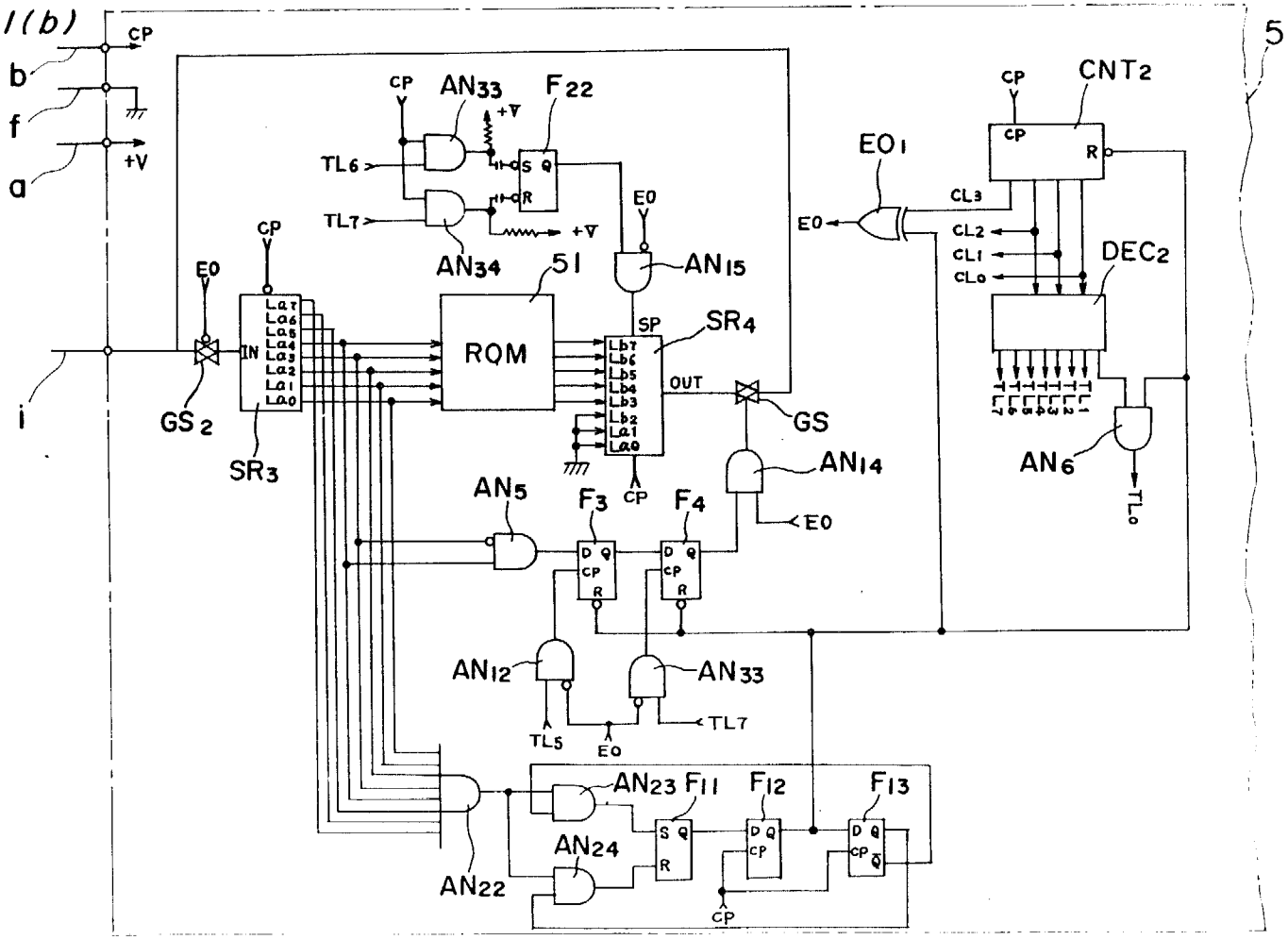
Figure 12:
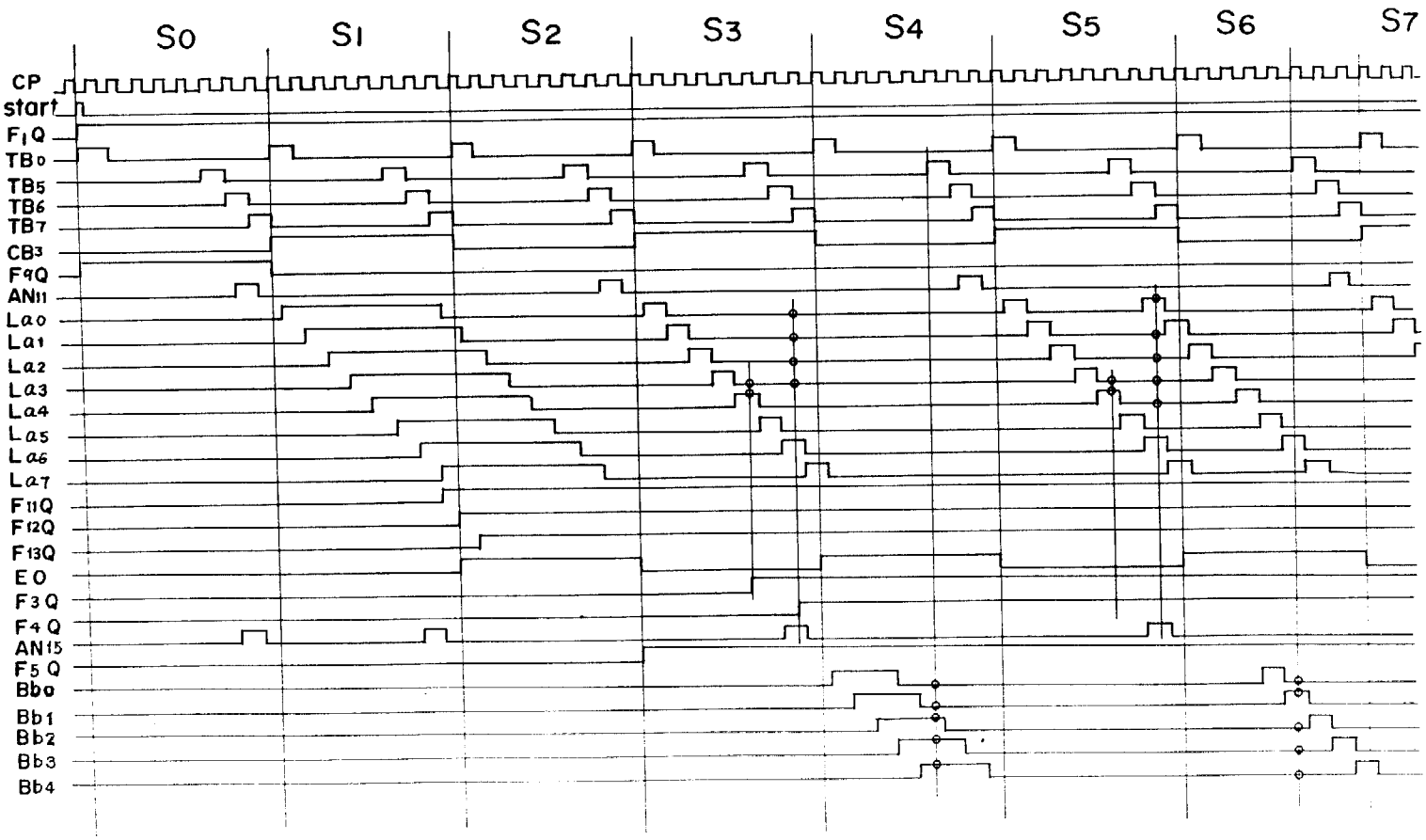
FIGS. 12 and 13 are time charts explanatory of functionings of the circuit of FIGS. 11(a) and 11(b)
Figure 13:
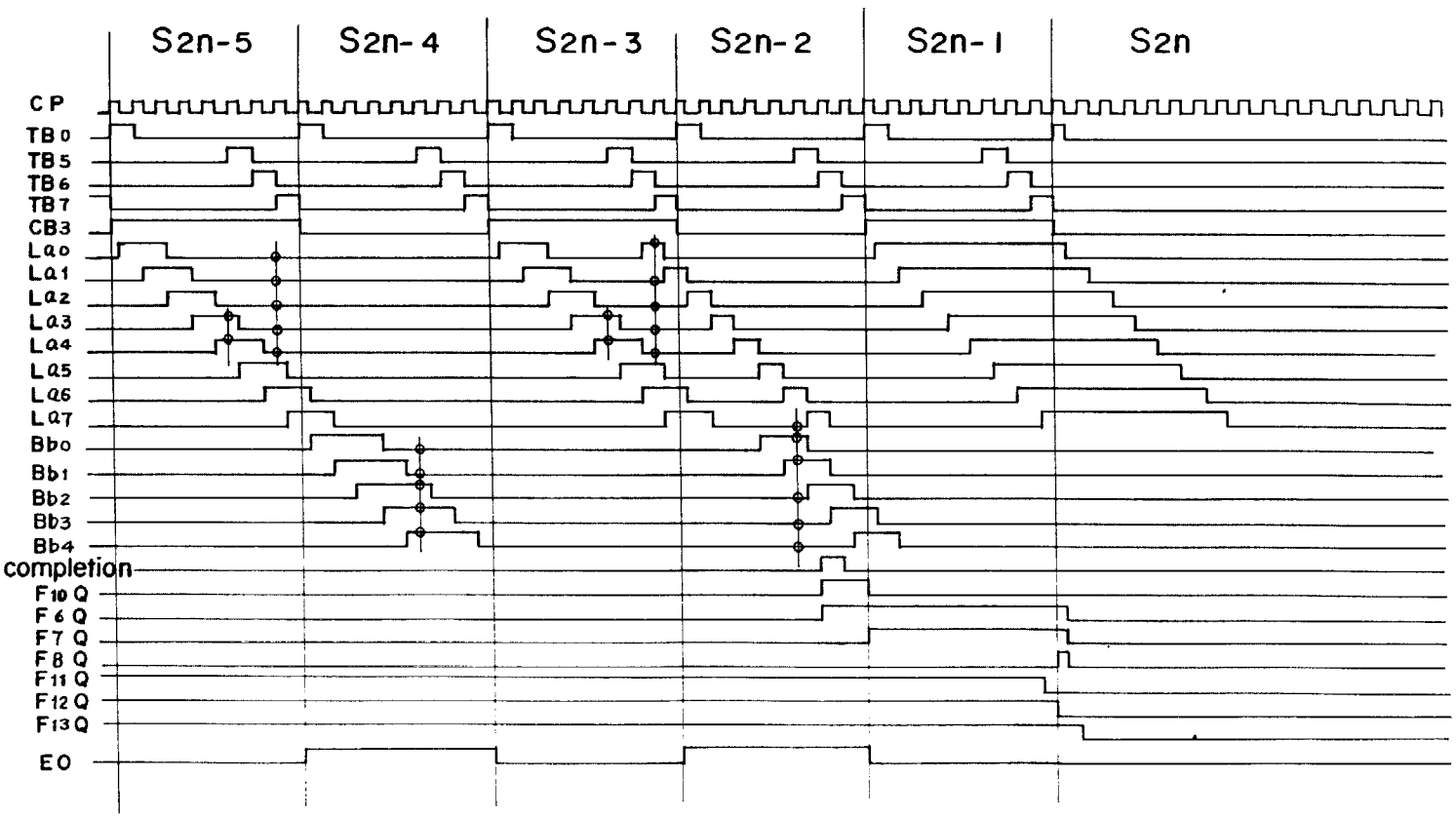

In the arrangement of FIGS. 11(a) to 11(b) to be described hereinbelow, there is shown a further modification in which the address data transfer line, data transfer line, and reset signal line are combined for common use so as to further reduce the number of the electrical connection terminals to four pieces. FIG. 12 is a time-chart during starting of the read-in function of the circuit of FIGS. 11(a) and 11(b), while FIG. 13 shows a time-chart at the completion of the reading-in function of the circuit of FIGS. 11(a) and 11(b).

In the arrangement of FIGS. 11(a) and 11(b), upon input of the read-in start signal, the flip-flops F1 and F9 are set (F1Q, F9Q in FIG. 12) in the similar manner as in FIGS. 8(a) and 8(b), and the counter CNT 1 is released from the reset state to start the functionings of the circuit. In the above case, since the flip-fop F9 is in the set state, the output of the OR circuit OR1 becomes "High", and the fixed data A of "11111111" are produced from the multiplexer MP1.

A flip-flop F21 coupled, at its Q terminal, to the AND circuit AN11 connected to a parallel input/serial output change-over terminal SP of the shift register SR1 and, at its set and reset terminals, to AND circuits AN31 and AN32 through corresponding capacitors, is set by the negative edge of the output of AND circuit AN31 and reset by the negative edge of the output of AND circuit AN32, while the AND circuit AN11 becomes "High" at the timing shown by AN11 in FIG. 12, since it is enabled when the terminal CB3 of the counter CNT 1 is "Low". The shift register SR1 which receives the above output is parallely applied with the output of the multiplexer MP1 by the positive edge of the clock pulses while the parallel input/serial output changeover terminal SP thereof is in the "High" state, while, during the period in which the output (i.e. the change-over terminal SP) of the AND circuit AN11 is in the "Low" state, the register SR1 serially produces the data at the output terminals in synchronization with the positive edge of the clock pulses.

At the time point where the step S0 is shifted to the step S1, the flip-flop F9 is reset (F9Q in FIG. 12), with the output of the OR circuit OR1 becoming "Low", and thereafter, the address data from the register REG 1 are produced from the multiplexer MP1. In the step S1, since the terminal CB3 of the counter CNT 1 is "High", the switch circuit GS1 is conducted, while the reset data "11111111" are produced at a terminal i connected to the output of the shift register SR1 and the input of the shift register SR3 through the switch circuits GS1 and GS2. In the above case, since the counter CNT 2 is in the reset state, the terminal CL3 becomes "Low", with the Q output of the D flip-flop F12 also being "Low". Accordingly, the output of an exclusive OR circuit, EO1 coupled to the counter CNT 2 and the flip-flop F12 is also "Low". Accordingly, the output of an exclusive OR circuit EO1 coupled to the counter CNT 2 and the flip-flop F12 becomes "Low" (EO in FIG. 12). Thus, the switch circuit GS2 is conducted, and the data from the terminal i are taken into the shift register SR3 in synchronization with the negative edge of the clock pulses (La0 to La7 in FIG. 12). When all of the outputs of the shift register SR3 have become "High", the output of the AND circuit AN22 rises to "High", and the flip-flop F11 is set through the AND circuit AN23 (F11Q in FIG. 12). Thus, the Q output of the flip-flop F12 becomes "High" (F12Q in FIG. 12) at the positive edge of the subsequent clock pulse, and the flip-flops F3 and F4 and the counter CNT 2 are released from the reset state. By the next clock pulse, the Q output of the flip-flop F13 becomes "High" so as to disable the AND circuit AN23 and to enable the AND circuit AN24 on the contrary, and thus, the Q outputs of the flip-flops F11, F12 and F13 remain "High" until all the outputs of the shift register SR3 become "High" again.

In the step S2, the address data are latched in the register REG 1 by the rising of the timing pulse TB1, and at the timing of the rising of the timing pulse TB7 (i.e. the timing for rising of the clock pulse while the AND circuit AN11 is "High"), the address data "10000000" are taken in the shift register SR1.

In the step S3, the data from the shift register SR1 are again taken into the shift register SR3, and since the output of the AND circuit AN5 is "High" by the timing of the positive edge of the timing pulse TL5, the Q output of the flip-flop F3 becomes "High", while the Q output of the flip-flop F4 becomes "High" by the timing of the positive edge of the timing pulse TL7 (F4Q in FIG. 12). On the other hand, the shift register SR4 parallely takes in the data from the ROM 51 upon the positive edge of the clock pulse when the change-over terminal SP is "High", in the similar manner as in the shift register SR1. In this state, since the AND circuit AN15 becomes "High" only during the period shown at AN15 in FIG. 12, the data from the ROM 51 are parallely taken into the shift register SR4 at the timing of the positive edge of the timing pulse TL7 when the output of the exclusive OR circuit EO1 is "Low". At a step S4, when the output of the exclusive OR circuit EO1 becomes "High" (EO in FIG. 12), the switch circuit GS is conducted, with the switch circuit GS2 becoming non-conductive, and thus, the data from the shift register SR4 are sequentially produced from the terminal i. In the above state, in the circuit at the side of the camera body 1, the terminal CB3 of the counter CNT 1 is "Low" (CB3 in FIG. 12), with the Q output of the flip-flop F5 being "High" (F5Q in FIG. 12), and the switch circuit GS1 is not conducted, while the switch circuit GS3 is conducted, and thus, the AND circuits AN3 and AN4 are enabled. Accordingly, the data from the terminal i are sequentially taken into the shift register SR2 in synchronization with the negative edge of the clock pulse, and thus, the data are taken in the register REG 2 at the timing of positive edge of the timing pulse TB5. Subsequently, in a similar manner, through the terminal i, address data are fed from the camera body to the camera accessory in a step $S_{2k-1}$ (k is an integer), while in a step $S_{2k}$, data are fed from the camera accessory to the camera body, with these functionings being repeated.

Incidentally, on the assumption that the address of "1100000" (the leading address of the addresses for the lens accessory in Table 1) is designated in a step $S_{2n-5}$, the check code "11100" is read at a step $S_{2n-4}$, and the address "1100001" is designated at a step $S_{2n-3}$, while the data "00011" are read at a step $S_{2n-2}$ so as to read the data indicating that the lens accessory is a rear-converter or tele-converter. Upon completion of reading of the data related to the lens accessory as described above, the read-in completion signal is produced (completion in FIG. 13) at the timing of the timing pulse TB6, and the flip-flops F10 and F6 are set (F10Q, F6Q in FIG. 13), whereby the output of the OR circuit OR1 becomes "High" again, with the data "11111111" being produced from the multiplexer MP1 so as to be parallely taken into the shift register SR1. On the other hand, the flip-flop F10 is reset at the timing pulse TB7 (F10Q in FIG. 13), and further, the D flip-flop F7 takes in the Q output of the flip-flop F6 (F7Q in FIG. 13) upon falling of the timing pulse TB7. Moreover, by the rising of the clock pulse when the AND circuit AN11 is in the "High" state, the data "11111111" from the multiplexer MP1 are parallely taken into the shift register SR1.

At a step $S_{2n-1}$, the above data "11111111" are fed from the shift register SR1 to the input terminal of the shift register SR3 through the switch circuits GS1 and GS2, in synchronization with the positive edge of the clock pulses from the AND circuit AN1, and are sequentially taken thereinto in synchronization with the negative edge of the clock pulses. At the time point where all the outputs of the shift register SR3 have become "High", the output of the AND circuit AN22 rises to "High". In the above case also, since the Q output of the flip-flop F13 is in the "High" state, the output of the AND circuit AN24 rises to reset the flip-flop F11. In the subsequent clock pulse, the D flip-flop F12 takes in the Q output of the flip-flop F11, with the Q output of said flip-flop F12 falling to "Low" (F12Q in FIG. 13), and thus, the D flip-flops F3 and F4 and counter CNT 2 are reset, while the output TL0 of the AND circuit AN6 and that of the exclusive OR circuit EO1 become "Low", and at the positive edge of the subsequent clock pulse, the Q output of the D flip-flop F13 becomes "Low" (F13Q in FIG. 13), whereby the circuit at the side of the camera accessory 5 is brought into the state waiting for input of a next read-in start signal.

In the circuit at the side of the camera body 1, by the falling of the timing pulse TB7 at the step $S_{2n-1}$, the Q output of the D flip-flop F3 becomes "High" (F3Q in FIG. 13), with the clock pulse being produced from the AND circuit AN21, and at the negative edge of said clock pulse, the flip-flops F1 and F6, D flip-flops F2, F7 and F8 are reset, and thus, by the resetting of the flip-flop F1, the counter CNT 1 is also reset so as to wait for the subsequent read-in start signal to be input.

It should be noted that in the circuit arrangements in FIGS. 3, 6, 8 and 11, resetting is, of course, required by the power-on reset signal upon closing of the power supply at the side of the camera body 1. It is also necessary to arrange to reset the circuits within the camera accessories by providing power-on reset signal generation circuits in the respective camera accessories so that the power-on reset signals are produced when the camera accessories are connected to the camera body 1 and power is started to be fed to the data output units of these camera accessories.

Meanwhile, in the case of the camera accessory such as a lens accessory or the like in which the kind of data to be fixedly stored therein are few, and which may be produced only in a small number, the ROM to be provided therein may be of a programmable ROM, fuse ROM or the like, suitable for production in a small number, while wirings therefor may be effected by wiring patterns or soldering of a print circuit board.

Figure 14:
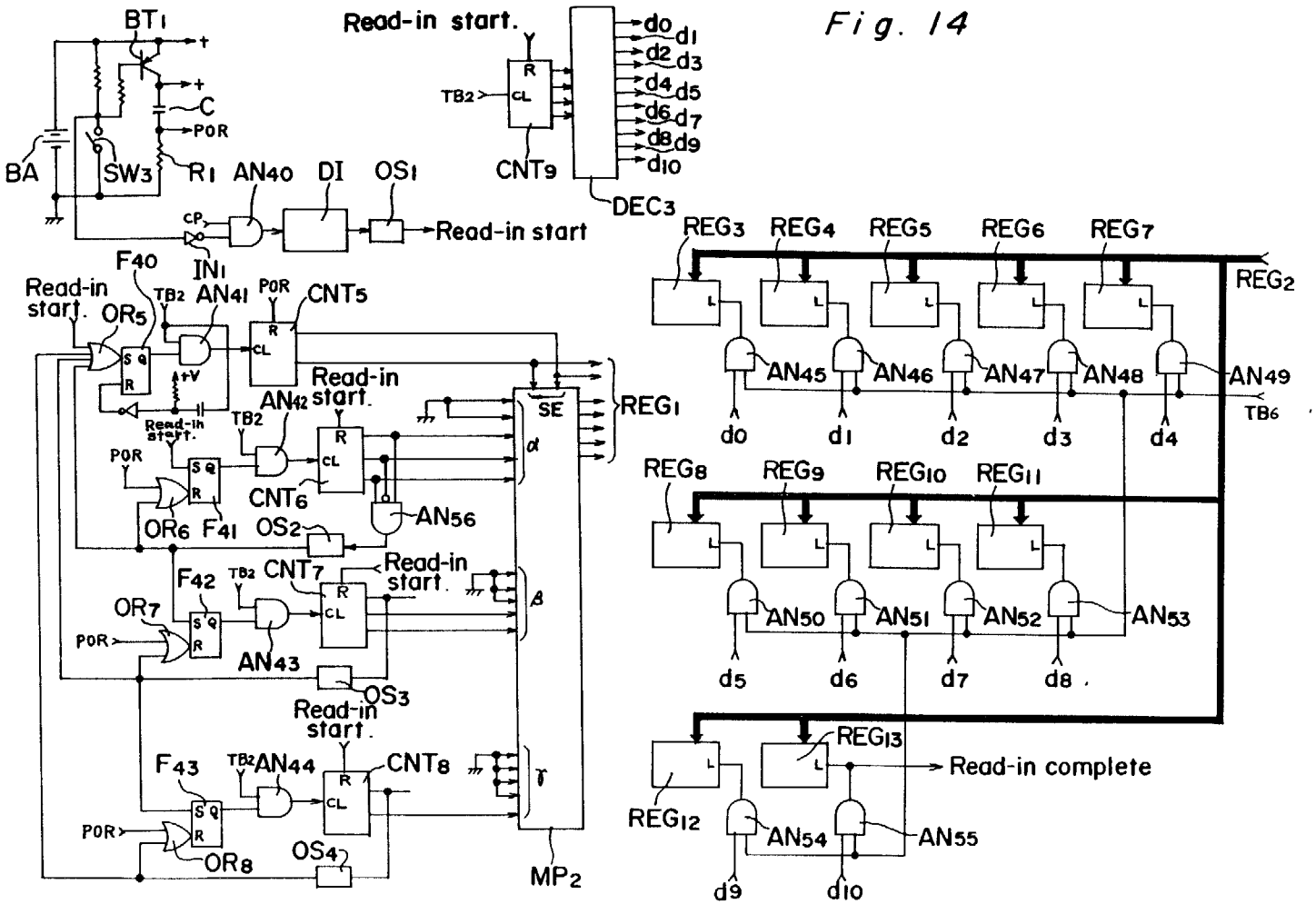
FIG. 14 is a circuit diagram showing a circuit construction at portions other than the data input and output portion at the camera body side in FIG. 3(a)

Referring further to FIG. 14, there are shown circuit arrangements for a portion for feeding the address data into the register REG 1 in FIG. 3(a) in the address output device 13, and a portion for reading in the data from the register REG 2 in the data input device 14.

In FIG. 14, the light measuring switch SW3 coupled in parallel with a power source BA is connected to the emitter of a transistor BT1 through a resistor and also, to the collector of said transistor BT1 through a series connection of a resistor R1 and a capacitor C1, with a fixed contact thereof being connected to the base of the transistor BT1 through another resistor and also, to a one-shot circuit OS1 through an inverter IN1, an AND circuit AN40 and a frequency divider DI as shown.

Upon closure of the light measuring switch SW3, the power supply transistor BT1 is rendered conductive, and a reset signal (power-on-reset signal) POR is produced from the power-on reset circuit constituted by the capacitor C1 and resistor R1, and thus, flip-flops F41, F42 and F43 which receive said reset signal POR through corresponding OR circuit OR6, OR7 and OR8 coupled to counters CNT 6, CNT 7 and CNT 8 via AND circuits AN42, AN43 and AN44, and a counter CNT 5 coupled through an AND circuit AN41, to a flip-flop F40 as shown in FIG. 14, are reset. To the set terminal of the flip-flop F40, there is connected an OR gate OR5 which receives the read-in start signal from the one shot circuit DS1 and is connected to the counter CNT 6 through a one shot circuit OS2 and an AND gate AN56, and to the counter CNT 7 through a one shot circuit OS3, and also to the counter CNT 8 through a one-shot circuit OS4 as shown. Meanwhile, by the closure of the light measuring switch SW3, the output of the inverter IN1 becomes "High" to open the gate of the AND gate AN40, and the clock pulses CP are applied to the frequency divided DI to produce a pulse with a predetermined period obtained by subjecting said clock pulse to frequency division from said frequency divider DI, and thus, the read-in start signal is produced at each predetermined period from the one-shot circuit OS1. Accordingly, in this embodiment, since it is so arranged that, during the closing of the light measuring switch SW3, the data from the camera accessory are automatically read in periodically, and therefore, the switch for detecting the mounting of the accessory such as the switch S1 in FIG. 2 and the like, may be dispensed with.

In the first place, functions for feeding the address data to the register REG 1 according to the read-in start signal will be described hereinbelow.

Upon output of the read-in start signal, the flip-flops F40 and F41 are set to open the gates of the AND circuits AN41 and AN42, while the counters CNT 6, CNT 7 and CNT 8 are reset, and at the step S0, the output of the counter CNT 5 becomes "01" by the timing pulse of TB0, and by the falling of this timing pulse TB0, the flip-flop F40 is reset, with the timing pulse TB0 not being applied to the counter CNT 5 thereafter. Thus, as described previously, the register REG 1 latches the outputs of the counter CNT 5 and the multiplexer MP2 as the address data at the positive edge of the timing pulse TB1, and in the above case, since the output of the counter CNT 5 is "01" and the output of the multiplexer MP2 is "00000", the address data to be latched in the register REG 1 become "1000000" so as to be the leading address for the interchangeable lens. It is to be noted here that the output of the counter CNT 5 is applied to the register REG 1 in a state where the output bits thereof are reversed in the order between the front and rear sides, and also that, the multiplexer MP2 is arranged to produce the input data $\alpha$ thereto when the counter CNT 5 is of "01", the input data $\beta$ when the counter CNT 5 is of "10", and the input data Y when the counter CNT 5 is of "11".

At the positive edge of the timing pulse TB2, the counter CNT 6 becomes "001" through counting up by one via the AND gate AN42, and in the next step S1, address data "1000001" are latched in register REG 1 by the positive edge of the timing pulse TB1, and thus, by the positive edge of the timing pulse TB2, the output of the counter CNT 6 becomes "010". Subsequently, through repetition of the similar functionings, the address data for the lens are sequentially taken into the register REG 1. In the step S4, the address data of "1000100" (last address for the lens) are latched in the register REG 1 by the timing of the positive edge of the timing pulse TB1, and when the output of the counter CNT 6 becomes "101" by the positive edge of the timing pulse TB2, the output of the AND circuit AN56 rises to "High" to produce pulses from the one shot circuit OS2. By the above pulses, the flip-flop F41 is reset through the OR circuit OR6, while the flip-flop F40 is set through the OR circuit OR5, and further, the flip-flop F42 is set directly.

In a step S5, the output of the counter CNT 5 becomes "10" by the positive edge of the timing pulse TB0, and the data for $\beta$ are produced from the multiplexer MP2. Accordingly, the address data to be latched in the register REG 1 by the positive edge of the subsequent pulse TB1 become "0100000" so as to be the leading address for the electronic flash. Thus, the timing pulse TB2 is fed to the counter CNT 7 through the AND circuit AN48, with the output thereof becoming "001". Subsequently, similar functionings are repeated, and at a step S8, the address data "0100011" (last address for the electronic flash) are latched in the register REG 1 at the positive edge of the timing pulse TB1, and when the uppermost output bit of the counter CNT7 becomes "High" (output of "100") by the positive edge of the next pulse TB2, a pulse of "High" is produced from the one shot circuit OS3. By the above pulse, the flip-flop F42 is reset through the OR circuit OR7, while the flip-flop F40 is set through the OR circuit OR5, and further, the flip-flop F43 is set directly, whereby the AND circuit AN43 is disabled, and the AND circuits AN41 and AN44 are enabled.

In a step S9, by the rising of the timing pulse TB0, the output of the counter CNT 5 becomes "11" to allow the data $\beta$ to be produced from the multiplexer MP2, and at the positive edge of the timing pulse TB1, the address data of "1100000" (the leading address for the lens accessory) are latched in the register REG 1. Thus, by the positive edge of the timing pulse TB2, the output of the counter CNT8 becomes "01", and in a step S10, the address data of "1100001" are latched in the register REG 1 by the positive edge of the timing pulse TB1. When the upper bit of the counter CNT 8 becomes "High" (output is "10") by the positive edge of the timing pulse TB2, a pulse of "High" is produced from the one shot circuit OS3. By the above pulse, the flip-flop F43 is reset, with the gate of the AND circuit AN44 closed, and further, the flip-flop F40 is set through the OR circuit OR5 to open the gate of the AND circuit AN40. In a step S11, the output of the counter CNT 5 is altered from "11" to "00" by the timing pulse TB0, and the flip-flop F40 is reset by the negative edge of the timing pulse TB0 so as to close the gate of the AND circuit AN40. By the functions as described so far, the functioning for producing the address data is completed so as to establish a state waiting for the subsequent read-in start signal to be produced from the one shot circuit OS1.

Subsequently, functionings for reading the data read in the register REG 2, into registers REG 3, REG 4, REG 5, REG 6, REG 7, REG 8, REG 9, REG 10, REG 11, REG 12 and REG 13 will be described hereinbelow.

A counter CNT 9 is reset by the read-in start signal to count the timing pulse TB2, and the outputs from the counter CNT9 are applied to a decoder DEC 3 connected thereto, and are converted into outputs d0, d1, d2, d3, d4, d5, d6, d7, d8, d9 and d10 as shown in Table 4 so as to be produced from said decoder DEC 3.

TABLE 4

| Counter | d0 | d1 | d2 | d3 | d4 | d5 | d6 | d7 | d8 | d9 | d10 | Step |
|---|---|---|---|---|---|---|---|---|---|---|---|---|
| 0000 | L | L | L | L | L | L | L | L | L | L | L | S0 |
| 0001 | L | L | L | L | L | L | L | L | L | L | L | S1 |
| 0010 | H | L | L | L | L | L | L | L | L | L | L | S2 |
| 0011 | L | H | L | L | L | L | L | L | L | L | L | S3 |
| 0100 | L | L | H | L | L | L | L | L | L | L | L | S4 |
| 0101 | L | L | L | H | L | L | L | L | L | L | L | S5 |
| 0110 | L | L | L | L | H | L | L | L | L | L | L | S6 |
| 0111 | L | L | L | L | L | H | L | L | L | L | L | S7 |
| 1000 | L | L | L | L | L | L | H | L | L | L | L | S8 |
| 1001 | L | L | L | L | L | L | L | H | L | L | L | S9 |
| 1010 | L | L | L | L | L | L | L | L | H | L | L | S10 |
| 1011 | L | L | L | L | L | L | L | L | L | H | L | S11 |
| 1100 | L | L | L | L | L | L | L | L | L | L | H | S12 |

As described earlier, in the steps SO and S1, since the data from the accessory have not yet been read in the register REG2 (FIG. 4), the outputs of the decoder DEC 3 are all in the "Low" state. Accordingly, the gates of AND circuits AN45, AN46, AN47, AN48, AN49, AN50, AN51, AN52, AN53, AN54 and AN55 respectively coupled to the registers REG 3 to REG 13 are closed and thus the data are not taken in said registers REG 3 to REG 13. In the step S2, at the positive edge of the timing pulse TB5, first data are taken into the register REG 2. In the above state, owing to the "High" state of the terminal d0, the gate of the AND circuit AN45 is kept open, and thus, by the positive edge of the subsequent timing pulse TB6, the data latched in the register REG 2 are latched in the register REG 3.

Subsequently, in the similar manner as described above, by the positive edge of the timing pulse TB6, the data from the register REG 2 are respectively taken into the registers REG 4 to REG 13 sequentially through the AND circuit AN46 to AN55. Thus, at a step S12, when the last data are latched in register REG 13 by the timing pulse TB6 from said AND circuit AN55, the read-in function is to be completed, and therefore, the timing pulse TB6 from said AND circuit AN55 is simultaneously fed to the circuit FIG. 3 as the read-in completion signal for the termination of the read-in function. Various data from the accessories latched in these registers REG3 to REG13 are used for exposure control functions, etc.

Figure 15:
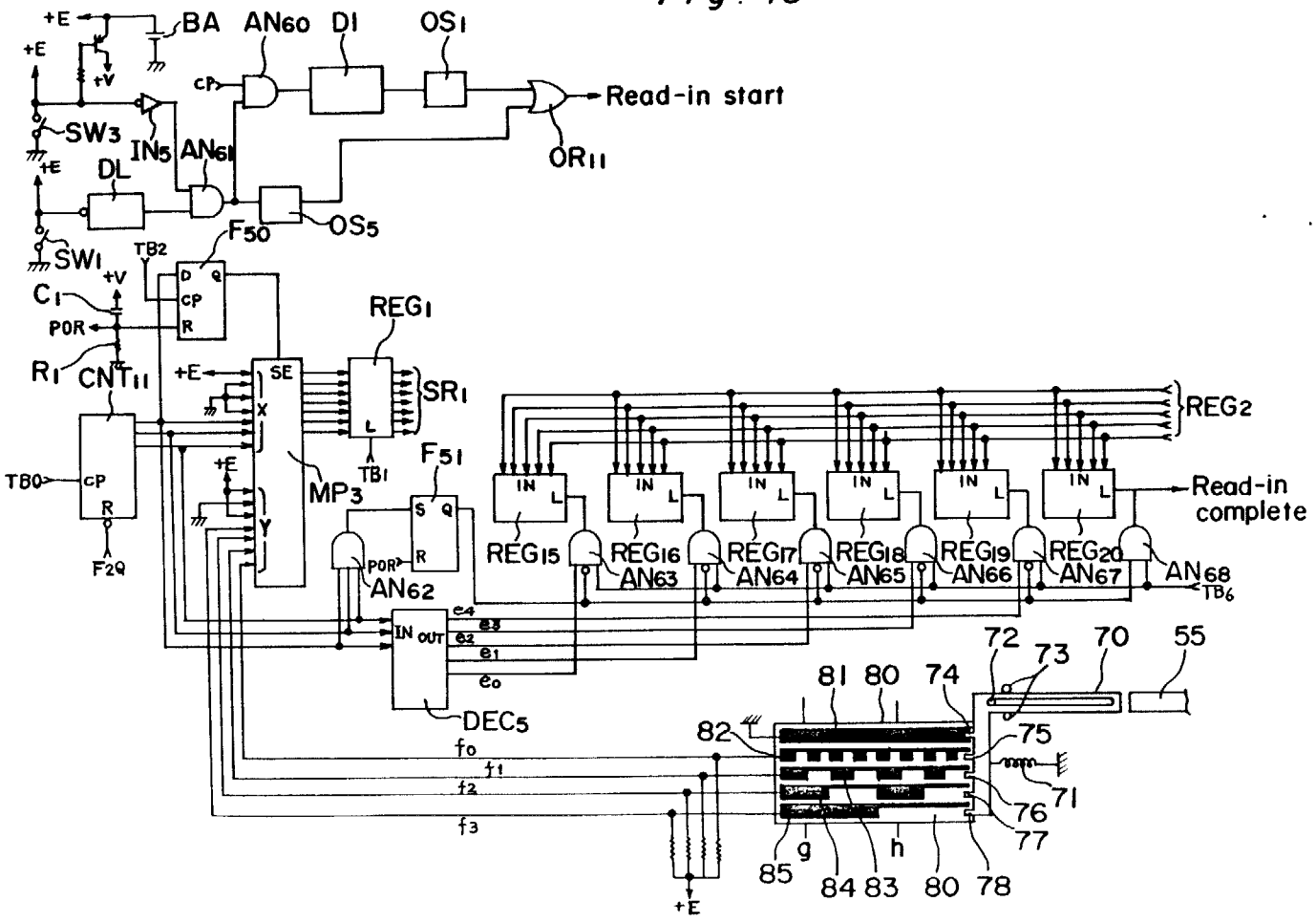
FIG. 15 is a circuit diagram similar to FIG. 14, which particularly shows another modification thereof.

Referring further to FIG. 15, there are shown circuit constructions of the address output device and data input device for reading data only from the interchangeable lens 5, and further, a circuit arrangement at the side of the camera body 1 adapted to read distance information from the interchangeable lens 5.

In FIG. 15, the mounting switch SW1 is coupled through a delay circuit DL to one input of an AND circuit AN61 whose other input is coupled with the circuit for the light measuring switch SW3 having the similar construction as in FIG. 14 through the inverter IN5, with the output of the AND circuit AN61 being connected to one input of an OR circuit OR11 through a one shot circuit OS5 and also to the other input of the OR circuit OR11 through the AND circuit AN60, frequency divider DI and one shot circuit OS1.

When the mounting switch SW1 is closed upon attaching of the interchangeable lens 5 to the camera body 1, the output of the delay circuit DL becomes "High" after a predetermined period of time set by said delay circuit DL. The delay time as described above is set at such a time period during which chattering at a signal pin contact portion between the lens 5 and the camera body 1 to be described later is settled for stabilization. Thus, upon closure of the light measuring switch SW3, when the output of the AND circuit AN61 becomes "High" through the invert IN5, the read-in start signal is produced from the one shot circuit OS5 through the OR circuit OR11 to start the read-in function. Meanwhile, as the AND circuit AN61 assumes a "High" state, the gate of the AND circuit AN60 is opened, and the clock pulses CP are fed into the frequency divider DI to produce the pulse at a predetermined period from said frequency divider DI. Accordingly, in the similar manner as in FIG. 14, the read-in start pulses are produced from the one shot circuit OS1 and OR circuit OR11 at the predetermined period based on the pulses from the frequency divider DI.

When the power-on reset signal POR is produced from the power-on reset circuit constituted by the capacitor C1 and the resistor R1 upon closing of the light measuring switch SW3, a flip-flop F50 which is coupled with a multiplexer MP3 connected to a counter CNT11 and the register REG 1, and a flip-flop F51 which is coupled, through an AND circuit 62, to said multiplexer MP3 and a decoder DEC 5, with the Q output of the flip-flop F51 and outputs of said decoder DEC 5 being further coupled to registers REG 15, REG 16, REG 17, REG 18, REG 19 and REG 20 (which are coupled to the register REG 2 in FIG. 3) through corresponding AND circuits AN63, AN64, AN65, AN66, AN67 and AN68 respectively as shown, are brought into the reset state. Since the multiplexer MP3 is arranged to produce data from a portion X when the input to its SE terminal is "Low", and data from a portion Y when said input is "High", upon starting of the read-in function by the closing of the light measuring switch SW3, the Q output of the D flip-flop F50 is in the "Low" state to produce the data from the portion X. In the step S0, owing to the fact that the Q output of the D flip-flop F2 in FIG. 3 remains "Low", the counter CNT 11 remains in a reset state, with the output thereof being "000". Accordingly, the data "1000000" are produced from the multiplexer MP3, and the above data are latched in the register REG 1 upon rising of the timing pulse TB1 as the address data which from the leading address for the interchangeable lens 5.

At the step S1, the Q output of the D flip-flop F2 becomes "High", and the counter CNT 11 is released from the reset state so as to count up one by the timing pulse TB0 for producing "001", while "1000001" are produced from the multiplexer MP3. These data are latched in the register REG 1 by the positive edge of the timing pulse TB1. In the step S2, the output of the counter CNT 11 becomes "010", and the output terminal e0 of the decoder DEC 5 becomes "High" as shown in Table 5 below, which shows the input and output relation of the decoder DEC 5 which decodes the count contents of the counter CNT 11.

TABLE 5

| CNT 11 | | | e0 | e1 | e2 | e3 | e4 | F31Q | Step |
|---|---|---|---|---|---|---|---|---|---|
| 0 | 0 | 0 | L | L | L | L | L | L | S0 |
| 0 | 0 | 1 | L | L | L | L | L | L | S1 |
| 0 | 1 | 0 | H | L | L | L | L | L | S2 |
| 0 | 1 | 1 | L | H | L | L | L | L | S3 |
| 1 | 0 | 0 | L | L | H | L | L | L | S4 |
| 1 | 0 | 1 | L | L | L | H | L | L | S5 |
| 1 | 1 | 0 | L | L | L | L | H | L | S6 |
| 1 | 1 | 1 | L | L | L | L | L | H | S7 |

Thus, by the positive edge of the timing pulse TB1, the data of "10000010" are latched in the register REG 1 as the address. On the other hand, the first data "11100" (check code) have been input to the register REG 2 (FIG. 3), and the timing pulse of TB6 is produced from the AND circuit AN63, with the data being latched in the register REG 15. In the step S3, the output of the counter CNT 11 becomes "011" at the positive edge of the timing pulse TB0 and the terminal e1 of the decoder DEC 5 assumes the "High" state so as to enable the AND circuit AN64. By the positive edge of the timing pulse TB1, the data "1000011" are latched in the register REG 1 as the address data, and at the positive edge of the timing pulse TB6, the data of the fully open aperture value Av0 are latched in the register REG 16 through the register REG 2.

In the step S4, by the positive edge of the timing pulse TB0, the output of the counter CNT 11 becomes "100", and at the positive edge of the timing pulse TB1, the data of "1000100" are latched in the register REG 1 as the address data. Thus, at the timing of the positive edge of the timing pulse TB2, the Q output of the D flip-flop F50 becomes "High", and the multiplexer MP3 produces the data of the portion Y thereafter.

The above data for the portion Y represents the focusing position of the interchangeable lens 5, and said focusing position is adapted to be detected at the side of the camera body 1. In connection with the above, through utilization of the fact that the relation between the amount of extension and the focused distance is constant for each interchangeable lens 5, data for distance are fixedly memorized in the ROM of each interchangeable lens 5 so as to correspond to the data for the above amount of extension as shown in Table 1. Accordingly, it is so arranged that, once the data for the focusing position of the lens 5 detected at the side of the camera body 1 are designated as they are for the address of the ROM 51 within the lens 5, the distance data stored in said address are taken into the side of the camera body 1 to provide the distance data.

In connection with the above, there are provided mechanical and electrical arrangements between the interchangeable lens 5 and the camera body 1 as described hereinbelow.

Still referring to FIG. 15, a movable member 55 is provided at the side of the interchangeable lens 5 for lateral movement in FIG. 15 in association with the focusing member, for example, a focusing ring (not particularly shown) of the lens 5, while at the side of the camera body 1, there is provided an L-shaped sliding member 70 which is slidably supported by a pin 72 received in an elongated opening formed in a horizontal portion of said sliding member 70 and pins 73 contacting side edges of said horizontal portion, and is normally urged by a spring 71 to contact the movable member 55 of the lens 5 for lateral movement following the movement of said movable member 55. Along one side edge of a vertical portion of said sliding member 70, there are formed brushes 74, 75, 76, 77 and 78 electrically conducted with each other for electrical contacts. Adjacent to the vertical portion of said sliding member 70 in positions corresponding to the contacts 74 to 78 of the sliding member 70, there is provided a code plate 80 having an electrode 81 connected to the ground, and electrodes 82, 83 84 and 85 respectively connected to a power supply +E through resistors (the electrodes 81 to 85 are shown by solid black lines in FIG. 15).

By the above arrangement, when the brushes or contacts 74, 75, 76, 77 and 78 provided on the sliding member 70 are located, for example, at a position "g" on the code plate 80, outputs of terminals f3, f2, f1 and f0 become "0001", and thus, the outputs of the multiplexer MP3 will be "1010001". Accordingly, if the interchangeable lens mounted to the camera body 1 is the 50 mm F1.4 lens in Table 1, the data "01101" for 4 m are produced from the interchangeable lens 5, and if the lens 5 mounted is a 135 mm F3.5 lens, the data "10110" for 19 m is to be produced from the lens 5. Meanwhile, when the contacts 74 to 78 of the sliding member 70 come to a position h, output "1001" is detected through the terminals f3 to f0, with the address of "1011001" being produced from the multiplexer MP3, and thus, the data of "00010" for 0.6 m are produced from the lens 5, if the attached lens 5 is of 50 mm F1.4, and the data of "01010" for 2.5 m, if the lens 5 is of 135 mm F3.5.

In the step S4, the terminal e2 of the decoder DEC 5 is in a state of "High", and the timing pulse of TB6 is produced from the AND circuit AN65 so that the data Avm for the minimum aperture value are latched in the register REG 17.

Subsequently, in the step S5, data for lens type are latched in the register REG 18, while in the step S6, data for focal length are latched in the register REG 19. In the step S7, the output of the counter CNT 11 becomes "111", with the output of the AND circuit AN62 rising to "High" to set the flip-flop F51, and thus, the AND circuit AN68 is enabled, so that the distance data are latched in the register REG 20 by the positive edge of the timing pulse TB6, while simultaneously, the pulse TB6 from the AND gate AN68 is fed to the circuit in FIG. 3 as the read-in completion signal.

If the light measuring switch SW3 is kept closed even after completion of the read-in, the subsequent read-in start signal is produced from the one shot circuit OS1. In the above case, since the Q output of the flip-flops F50 and F51 remain "High", only the data for the focusing position of the lens 5 are applied from the multiplexer MP3 to the register REG 1 at the step S0, and at the step S2, the distance data are latched in the register REG 20 to terminate the read-in function. In other words, the arrangement is so made that, when the light measuring switch SW3 remains to be closed, only the distance information is read repeatedly. Accordingly, in the case of the foregoing embodiment, the fixed information such as the minimum aperture value of the interchangeable lens, etc. is read only once, while variable information such as the distance information (and other information, for example, focal length information, information of set aperture values, etc. of a zoom lens) is adapted to be read repeatedly.

It should be noted here that in FIGS. 3(a) and 3(b), 6(a) and 6(b), 8(a) and 8(b). and 11(a) and 11(b), the shift register SR1 for the address data output and the shift register SR4 for the accessory data output are constituted by shift registers of 7 bit input or 8 bit input. Each of these shift registers, for example, in the case of 8 bit input, is arranged to take in the data parallely applied, at the positive edges of the timings TB7 and TL7, and subsequently, to serially output the data successively to the output terminal OUT from the data at the uppermost bit, at the positive edges of the timings TB0 to TB7, and TL0 and TL7. The shift register effecting the function as described above has the circuit construction as follows. In the first place, eight flip-flops in which the data of the respective bits parallely input are preset, are provided per each bit, and the output terminals of the flip-flops corresponding to the lower bits are connected to the input terminals of the flip-flops corresponding to the bits immediately above said lower bits. By the above arrangement, the data preset in the respective flip-flops in synchronization with the clock pulses are sequentially transferred from the lower bits to the upper bits. Moreover, the output terminal of the flip-flop in which the data of the uppermost bit are preset in the eight flip-flops, is connected to the input terminal of a ninth flip-flop further provided, and the output terminal of the ninth flip-flop is used for the output terminal of the shift register. By the construction as described above, the ninth flip-flop is arranged to output data at a delay by exactly one pulse through taking in of the output of the flip-flop in which the data at the uppermost bit are preset in synchronization with the clock pulses.

As is clear from the foregoing description, according to the present invention, in a photographing system in which a plurality of kinds of camera accessories are mounted on a camera body for effecting photographing while signals are transmitted between the camera body and the camera accessories, it is so arranged that the information as to the address of the fixed memory circuit of the particular accessory to be designated is contained in the address data produce from the camera main body, while the camera accessory side judges whether or not the input address data designate the fixed memory circuit thereof so as to feed out the data from the designated address of said fixed memory circuit according to the above result, and therefore, even when the plurality of camera accessories are connected to one camera body, there is no possibility that wrong data are read out by the address data from the camera main body, thus making it possible to effect expected photographing functions.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as included therein.

What is claimed is:

[1. In a camera system operable in accordance with memory data by means of carrying the memory data from a camera accessory to a camera body, the improvement comprising:

first means for carrying electric power from the camera body to the camera accessory to power the camera accessory;

second means for carrying a train of clock pulses from the camera body to the camera accessory to synchronize the camera accessory with the camera body;

third means for serially carrying address data from the camera body to the camera accessory to locate the memory data;

fourth means for serially carrying the memory data corresponding to the address data from the camera accessory to the camera body; and fifth means for carrying an initiating signal from the camera body to the camera accessory to control the timing of reading the memory data corresponding to the address data.]

[2. The improvement according to claim 1, further comprising means for generating the clock pulses to be transmitted through said second carrying means, means for converting the memory data serially received through said fourth carrying means into parallel data in response to the clock pulses of said generating means, means for serially providing the address data to be transmitted through said third carrying means in response to the clock pulses of said generating means, means for originating an operation signal in response to a manual operation of the camera, means for supplying the electric power to be transmitted through said first means in response to the operation signal of said originating means, means for producing the initiating signal to be transmitted through said fifth carrying means in response to the operation signal of said originating means, and means for storing the parallel data of said converting means, and wherein said first to fifth carrying means each include means for bringing the camera body into electric contact with the camera accessory when the camera accessory is attached to the camera body.]

[3. The improvement in claim 1, further comprising a read-only-memory for storing the memory data, means for converting the address data serially received through said third carrying means into parallel data to address said read-only-memory in response to the clock pulses received through said second carrying means, means for parallelly reading the addressed memory data in said read-only-memory and for serially outputting the read memory data through said fourth carrying means in response to the clock pulses received through said second carrying means, and means for controlling the timing of reading the memory data of said reading and outputting means in response to said initiating signal and said clock pulses received through said fifth and second carrying means, respectively, and wherein said first to fifth carrying means each include means for bringing the camera accessory into electric contact with the camera body when the camera accessory is attached to the camera body.]

4. In a camera system operable in accordance with stored memory data by means of carrying the memory data from a camera accessory to a camera body, the camera body comprising:

first means for transmitting electric power toward the camera accessory;

second means for transmitting a train of clock pulses toward the camera accessory;

third means for serially transmitting address data toward the camera accessory;

fourth means for serially receiving the memory data from the camera accessory;

fifth means for transmitting an initiating signal toward the camera accessory to control the timing of reading the memory data corresponding to the address data;

means for generating the clock pulses;

means for converting the serially received memory data into parallel data in response to the clock pulses;

means for serially providing the address data in response to the clock pulses;

means for originating an operation signal in response to a manual operation of the camera;

means for supplying the electric power in response to the operation signal;

means for producing the initiating signal in response to the operation signal; and means for storing the parallel data.

5. The camera body according to claim 4, wherein said third and fourth means in total include a common terminal [and] means for sequentially changing over the electric connection of said common terminal between said converting means and said providing means in response to the clock pulses.

6. The camera body according to claim 4, wherein said third and fifth means in total include a common terminal, and wherein said providing means and said producing means in total are adapted so that the address data are preceded by the initiating signal produced as special address data.

7. The camera body according to claim 4, wherein said third to fifth means in total include a common terminal and means for sequentially changing over the electric connection of said common terminal between said converting means and a combination of said providing means and said producing means in response to the clock pulses, and wherein the combination of said providing means and said producing means is adapted so that the address data are preceded by the initiating signal produced as special address data.

8. The camera body according to claim 4, wherein said first to fifth means are capable of being connected to a plurality of kinds of accessories, and wherein said providing means includes means for making the address data for respective accessories differ from each other.

9. The camera body according to claim 4, wherein said storing means includes a plurality of registers for sequentially receiving the parallel data from said converting means.

10. The camera body according to claim 4, wherein said supplying means includes means for maintaining the power supply while the operation signal is existing.

11. The camera body according to claim 4, wherein said producing means includes means for repeating the production of the initiating signal while the operation signal is existing.

12. The camera body according to claim 4, further comprising means for determining whether or not the camera accessory is attached to the camera body, and means for postponing the production of the initiating signal in accordance with the determining means when the camera accessory is not attached to the camera body.

[13. In a camera system operable in accordance with memory data by means of carrying the memory data from a camera accessory to a camera body, the camera accessory comprising:

first means for receiving electric power from the camera body;

second means for receiving a train of clock pulses from the camera body;

third means for serially receiving an address data from the camera body;

fourth means for serially transmitting the memory data toward the camera body;

fifth means for receiving an initiating signal from the camera body to control the timing of reading the memory data corresponding to the address data;

a read-only-memory for storing the memory data;

means for converting the serially received address data into parallel data to address said read-only-memory in response to the clock pulses;

means for parallelly reading the addressed memory data in said read-only-memory and for serially outputting the read memory data at said fourth means in response to the clock pulses; and means for controlling the timing of reading the memory data of said reading and outputting means in response to said initiating signal and said clock pulses.]

14. [The camera accessory according to claim 13,] *In a camera system operable in accordance with memory data by means of carrying the memory data from a camera accessory to a camera body, the camera accessory comprising:*

*first means for receiving electric power from the camera body;*

*second means for receiving a train of clock pulses from the camera body;*

*third means for serially receiving an address data from the camera body;*

*fourth means for serially transmitting the memory data toward the camera body;*

*fifth means for receiving an initiating signal from the camera body to control the timing of reading the memory data corresponding to the address data;*

*a read-only memory for storing the memory data;*

*means for converting the serially received address data into parallel data to access said read-only memory in response to the clock pulses;*

*means for parallelly reading the addressed memory data in said read-only-memory for serially outputting the read memory data at said fourth means in response to the clock pulses; and*

*means for controlling the timing of reading the memory data of said reading and outputting means in response to said initiating signal and said clock pulses;* wherein said third and fourth means in total include a common terminal and means for sequentially changing over the electric connection of said common terminal between said converting means and said reading and outputting means in response to the clock pulses.

15. [The camera accessory according to claim 13,] *In a camera system operable in accordance with memory data by means of carrying the memory data from a camera accessory to a camera body, the camera accessory comprising:*

*first means for receiving electric power from the camera body;*

*second means for receiving a train of clock pulses from the camera body;*

*third means for serially receiving an address data from the camera body;*

*fourth means for serially transmitting the memory data toward the camera body;*

*fifth means for receiving an initiating signal from the camera body to control the timing of reading the memory data corresponding to the address data;*

*a read-only memory for storing the memory data;*

*means for converting the serially received address data into parallel data to access said read-only memory in response to the clock pulses;*

*means for parallelly reading the addressed memory data in said read-only-memory for serially outputting the read memory data at said fourth means in response to the clock pulses; and*

*means for controlling the timing of reading the memory data of said reading and outputting means in response to said initiating signal and said clock pulses;* wherein said third and fifth means in total include a common terminal, and wherein said controlling means is responsive to special address data corresponding to said initiating signal.

16. [The camera accessory according to claim 13,] *In a camera system operable in accordance with memory data by means of carrying the memory data from a camera accessory to a camera body, the camera accessory comprising:*

*first means for receiving electric power from the camera body;*

*second means for receiving a train of clock pulses from the camera body;*

*third means for serially receiving an address data from the camera body;*

*fourth means for serially transmitting the memory data toward the camera body;*

*fifth means for receiving an initiating signal from the camera body to control the timing of reading the memory data corresponding to the address data;*

*a read-only memory for storing the memory data;*

*means for converting the serially received address data into parallel data to access said read-only memory in response to the clock pulses;*

*means for parallelly reading the addressed memory data in said read-only-memory for serially outputting the read memory data at said fourth means in response to the clock pulses; and*

*means for controlling the timing of reading the memory data of said reading and outputting means in response to said initiating signal and said clock pulses;* wherein said third to fifth means in total include a common terminal and means for sequentially changing over the electric connection of said common terminal between said reading and outputting means and a combination of said converting means and said controlling means in response to the clock pulses, and wherein said controlling means is responsive to a special address data corresponding to said initial data.

17. [The camera accessory according to claim 13,] *In a camera system operable in accordance with memory data by means of carrying the memory data from a camera accessory to a camera body, the camera accessory comprising:*

*first means for receiving electric power from the camera body;*

*second means for receiving a train of clock pulses from the camera body;*

*third means for serially receiving an address data from the camera body;*

*fourth means for serially transmitting the memory data toward the camera body;*

*fifth means for receiving an initiating signal from the camera body to control the timing of reading the memory data corresponding to the address data;*

*a read-only memory for storing the memory data;*

*means for converting the serially received address data into parallel data to access said read-only memory in response to the clock pulses;*

*means for parallelly reading the addressed memory data in said read-only-memory for serially outputting the read memory data at said fourth means in response to the clock pulses; and*

*means for controlling the timing of reading the memory data of said reading and outputting means in response to said initiating signal and said clock pulses;* further comprising means responsive to said converting means for examining whether or not the parallel data include an information designating the camera accessory to determine whether or not the memory data are to appear at said fourth means.

18. [The camera accessory according to claim 13,] *In a camera system operable in accordance with memory data by means of carrying the memory data from a camera accessory to a camera body, the camera accessory comprising:*

*first means for receiving electric power from the camera body;*

*second means for receiving a train of clock pulses from the camera body;*

*third means for serially receiving an address data from the camera body;*

*fourth means for serially transmitting the memory data toward the camera body;*

*fifth means for receiving an initiating signal from the camera body to control the timing of reading the memory data corresponding to the address data;*

*a read-only memory for storing the memory data;*

*means for converting the serially received address data into parallel data to access said read-only memory in response to the clock pulses;*

*means for parallelly reading the addressed memory data in said read-only-memory for serially outputting the read memory data at said fourth means in response to the clock pulses; and*

*means for controlling the timing of reading the memory data of said reading and outputting means in response to said initiating signal and said clock pulses;* wherein said read-only-memory includes a predetermined check data at an address to be addressed in a predetermined turn.

[19. The camera accessory according to claim 13, wherein the camera accessory consists of an exchangeable objective lens.]

[20. The camera accessory according to claim 13, wherein the camera accessory consists of a lens accessory.]

21. In a camera system operable in accordance with memory data by means of carrying the memory data from a camera accessory to a camera body, the camera body comprising:

means for generating a train of clock pulses;

means for transmitting the clock pulses toward the camera accessory;

means for serially receiving the memory data from the camera accessory;

means for converting the serially received memory data into parallel data in response to the clock pulses;

means for storing the parallel data;

means for transmitting a controlling signal toward the camera accessory to control the camera accessory so that the transmission of the memory data from the camera accessory toward the camera body is enabled during the transmission of the controlling signal;

means for originating an operation signal in response to a manual operation of the camera; and means for producing the controlling signal in response to the operation signal, said producing means including means for repeating the production of the controlling signal during the time period the operation signal is existing.

22. The camera body according to claim 21, further comprising means for transmitting electric power toward the camera body, and means for supplying the electric power during the time that the operation signal is existing.

[23. In a camera system operable in accordance with memory data by means of carrying the memory data from a camera accessory to a camera body, the camera accesory comprising:

first means for receiving electric power from the camera body;

second means for receiving a train of clock pulses from the camera body;

a read-only memory for storing the memory data;

third means for receiving a controlling signal from the camera body;

means for parallely reading the memory data from said read-only memory and for serially outputting the read memory data in response to the clock pulses, said reading and outputting means including means responsive to the controlling signal for enabling the serially outputting operation during the time that the controlling signal is being received; and means for serially transmitting the read memory data toward the camera body.]

24. [The camera system according to claim 23,] *In a camera system operable in accordance with memory data by means of carrying the memory data from a camera accessory to a camera body, the camera accessory comprising:*

*first means for receiving electric power from the camera body;*

*second means for receiving a train of clock pulses from the camera body;*

*a read-only memory for storing the memory data;*

*third means for receiving a controlling signal from the camera body;*

*means for parallely reading the memory data from said read-only memory and for serially outputting the read memory data in response to the clock pulses, said reading and outputting means including means responsive to the controlling signal for enabling the serially outputting operation during the time that the controlling signal is being received; and*

*means for serially transmitting the read memory data toward the camera body* wherein said read-only memory includes a predetermined check data.

25. [The camera system according to claim 23,] *In a camera system operable in accordance with memory data by means of carrying the memory data from a camera accessory to a camera body, the camera accessory comprising:*

*first means for receiving electric power from the camera body;*

*second means for receiving a train of clock pulses from the camera body;*

*a read-only memory for storing the memory data;*

*third means for receiving a controlling signal from the camera body;*

*means for parallely reading the memory data from said read-only memory and for serially outputting the read memory data in response to the clock pulses, said reading and outputting means including means responsive to the controlling signal for enabling the serially outputting operation during the time that the controlling signal is being received; and*

*means for serially transmitting the read memory data toward the camera body* wherein the camera accessory consists of a lens accessory.

26. [The camera system according to claim 23,] *In a camera system operable in accordance with memory data by means of carrying the memory data from a camera accessory to a camera body, the camera accessory comprising:*

*first means for receiving electric power from the camera body;*

*second means for receiving a train of clock pulses from the camera body;*

*a read-only memory for storing the memory data;*

*third means for receiving a controlling signal from the camera body;*

*means for parallely reading the memory data from said read-only memory and for serially outputting the read memory data in response to the clock pulses, said reading and outputting means including means responsive to the controlling signal for enabling the serially outputting operation during the time that the controlling signal is being received; and*

*means for serially transmitting the read memory data toward the camera body* wherein the camera accessory consists of an exchangeable objective lens.

27. The camera system according to claim 26, wherein said read-only memory includes data representative of a fully open aperture size of the exchangeable objective lens.

28. The camera system according to claim 26, wherein said read-only memory includes data representative of a minimum aperture size of the exchangeable objective lens.

29. The camera system according to claim 26, wherein said read-only memory includes data representative of a focal length of the exchangeable objective lens.

*30. In a camera system operable in accordance with data communication between a camera body and a plurality of kinds of detachable camera accessories to be attached to different exclusive connecting portions of the camera body, the camera body comprising:*

*a plurality of electric contacts exposed at a first portion of the camera body for exclusive electric connection with a first kind of the detachable camera accessory;*

*means for controlling the data communication between the camera body and all the plurality of kinds of camera accessories;*

*a plurality of signal lines for connecting the electric contacts to the controlling means, respectively;*

*said controlling means including means connected to said plurality of signal lines for controlling the transmission of digital signals from the camera body to the plurality of kinds of camera accessories and from the plurality of kinds of camera accessories to the camera body;*

*at least one electric contact exposed at a second portion of the camera body for exclusive electric connection with a second kind of the detachable camera accessory; and*

*at least one signal line for connecting the electric contact at the second portion to at least one of the plurality of signal lines, whereby not only the data communication between the controlling means and the first kind of camera accessory, but also at least some of the data communication between the controlling means and the second kind of camera accessory appears at the plurality of electric contact exposed at the first portion of the camera body.*

*31. The camera body according to claim 30 further comprising a manually operable switch for shutter release, wherein the controlling means includes means for periodically repeating the data communication between the camera body and the plurality of kinds of camera accessories during a time when the switch continues to be manually operated.*

*32. In a camera system operable in accordance with data communication between a camera body and a plurality of kinds of detachable camera accessories to be attached to different exclusive connecting portions of the camera body, the camera body comprising:*

*a plurality of electric contacts exposed at a first portion of the camera body for exclusive electric connection with a first kind of the detachable camera accessory;*

*means for controlling the data communication between the camera body and all the plurality of kinds of camera accessories, the controlling means including means for carrying out a serial time-shared data communication between the camera body and the plurality of kinds of camera accessories, said means for carrying out a serial time-shared data communication having means for identifying the share of time during which each camera accessory is in communication with the camera body and means for receiving data to be serially transmitted from the camera accessories;*

*a plurality of signal lines for connecting the electric contacts to the controlling means, respectively;*

*at least one electric contact exposed at a second portion of the camera body for exclusive electric connection with a second kind of the detachable camera accessory; and*

*at least one signal line for connecting the electric contact at the second portion to at least one of the plurality of signal lines, whereby not only the data communication between the controlling means and the first kind of camera accessory, but also at least some of the data communication between the controlling means and*

*the second kind of camera accessory appears at the plurality of electric contacts exposed at the first portion of the camera body.*

*33. The camera body according to claim 32 further comprising a manually operable switch for shutter release, wherein the controlling means includes means for periodically repeating the data communication between the camera body and the plurality of kinds of camera accessories during a time when the switch continues to be manually operated.*

* * * * *